(12) United States Patent
Iwakiri et al.

(10) Patent No.: US 12,238,411 B2
(45) Date of Patent: Feb. 25, 2025

(54) INFORMATION PROCESSING APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Yoshiki Iwakiri, Kanagawa (JP); Hajime Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/117,510

(22) Filed: Mar. 6, 2023

(65) Prior Publication Data

US 2023/0209180 A1 Jun. 29, 2023

Related U.S. Application Data

(63) Continuation of application No. 17/174,863, filed on Feb. 12, 2021, now Pat. No. 11,627,256, which is a (Continued)

(30) Foreign Application Priority Data

Aug. 31, 2018 (JP) .................. 2018-163621
Aug. 31, 2018 (JP) .................. 2018-163623

(51) Int. Cl.
*H04N 23/63* (2023.01)
*H04N 13/111* (2018.01)
(Continued)

(52) U.S. Cl.
CPC ......... *H04N 23/634* (2023.01); *H04N 13/111* (2018.05); *H04N 13/243* (2018.05); *H04N 17/002* (2013.01); *H04N 23/90* (2023.01)

(58) Field of Classification Search
CPC .. H04N 23/634; H04N 13/111; H04N 13/243; H04N 17/002; H04N 23/90; H04N 13/117; H04N 13/282; H04N 7/18
(Continued)

(56) References Cited

U.S. PATENT DOCUMENTS 7,145,688 B2   12/2006  Minagawa
9,501,828 B2 * 11/2016  Takiguchi ................ G06T 7/33
(Continued)

FOREIGN PATENT DOCUMENTS

JP    H09-139872 A    5/1997
JP    2005-250887 A   9/2005
(Continued)

OTHER PUBLICATIONS

International Search Report issued in International Application No. PCT/JP2019/032620 dated Nov. 5, 2019, pp. 1-2, English Translation.

*Primary Examiner* — Thai Q Tran
*Assistant Examiner* — Stephen R Smith
(74) *Attorney, Agent, or Firm* — Carter, DeLuca & Farrell LLP

(57) ABSTRACT

An information processing apparatus obtains a plurality of processing steps concerning a work in installation or operation of a system including a plurality of apparatuses, and progress statuses of the plurality of processing steps, and causes a display unit to display a screen including information representing the plurality of processing steps and the progress statuses of the plurality of processing steps.

18 Claims, 28 Drawing Sheets

Related U.S. Application Data continuation of application No. PCT/JP2019/032620, filed on Aug. 21, 2019.

(51) Int. Cl.
*H04N 13/243* (2018.01)
*H04N 17/00* (2006.01)
*H04N 23/90* (2023.01)

(58) Field of Classification Search
USPC .................................................. 348/48, 159
See application file for complete search history.

(56) References Cited

U.S. PATENT DOCUMENTS

| | | | | |
|---|---|---|---|---|
| 10,284,794 | B1* | 5/2019 | Francois | ................ H04N 23/64 |
| 10,972,350 | B2* | 4/2021 | Varghese | ............ H04L 41/0843 |
| 2008/0144123 | A1* | 6/2008 | Suzuki | ................ H04N 1/4076 |
| | | | | 358/448 |
| 2011/0254958 | A1* | 10/2011 | Kotani | ................ G06T 15/205 |
| | | | | 348/E7.085 |
| 2017/0148167 | A1* | 5/2017 | Aratani | ..................... G06T 7/60 |
| 2018/0115679 | A1* | 4/2018 | Kusano | .............. H04N 1/00424 |
| 2018/0225840 | A1* | 8/2018 | Ikeda | ................... H04N 13/243 |
| 2018/0324410 | A1* | 11/2018 | Roine | ................. H04N 23/698 |
| 2019/0026634 | A1* | 1/2019 | Homeyer | ............... G06N 20/00 |
| 2019/0191146 | A1* | 6/2019 | Koyama | ................ H04N 5/222 |
| 2019/0306408 | A1* | 10/2019 | Hofer | ..................... H04N 23/90 |
| 2020/0042812 | A1* | 2/2020 | Sakaguchi | ............ G06Q 50/30 |
| 2022/0086413 | A1 | 3/2022 | Adachi et al. | |
| 2023/0026038 | A1 | 1/2023 | Iwakiri | |

FOREIGN PATENT DOCUMENTS

| | | | |
|---|---|---|---|
| JP | 2008-015756 A | | 1/2008 |
| JP | 2009-181482 A | | 8/2009 |
| JP | 2010020487 A | * | 1/2010 |
| JP | 2011-071920 A | | 4/2011 |
| JP | 2014-215828 A | | 11/2014 |
| JP | 2017-096725 A | | 6/2017 |
| JP | 2017-191492 A | | 10/2017 |
| JP | 2018-107793 A | | 7/2018 |
| WO | 2018/070121 A1 | | 4/2018 |

\* cited by examiner

FIG. 6

| ID | CATEGORY | PROCESS | REQUEST |
|---|---|---|---|
| 1 | APPARATUS CONNECTION | CAMERA | CAMERA CONNECTION CONFIRMATION |
| 2 | | LENS | LENS CONNECTION CONFIRMATION |
| 3 | | UNIVERSAL HEAD | UNIVERSAL HEAD CONNECTION CONFIRMATION |
| 4 | SYNCHRONIZATION | SYNCHRONIZATION | SYNCHRONIZATION SETTING |
| 5 | ANGLE ADJUSTMENT | UNIVERSAL HEAD ANGLE | PAN/TILT SETTING |
| 6 | | ZOOM | ZOOM SETTING |
| 7 | | FOCUS | FOCUS SETTING |
| 8 | EXPOSURE ADJUSTMENT | ISO | ISO SETTING |
| 9 | | IRIS | IRIS SETTING |
| 10 | | SHUTTER | SHUTTER SETTING |
| 11 | | ND | ND FILTER SETTING |
| 12 | | IMAGE CAPTURING | IMAGE CAPTURING START REQUEST |
| 13 | CAL | CALCULATION | CAL CALCULATION |
| 14 | | SETTING | CAL DATA SETTING |

FIG. 7

| ID | CATEGORY | PROCESS | STATE |
|---|---|---|---|
| 1 | APPARATUS CONNECTION | CAMERA | NORMAL END |
| 2 | APPARATUS CONNECTION | LENS | NORMAL END |
| 3 | APPARATUS CONNECTION | UNIVERSAL HEAD | NONEXECUTING |
| 4 | SYNCHRONIZATION | SYNCHRONIZATION | NONEXECUTING |
| 5 | ANGLE ADJUSTMENT | UNIVERSAL HEAD ANGLE | NONEXECUTING |
| 6 | ANGLE ADJUSTMENT | ZOOM | NONEXECUTING |
| 7 | ANGLE ADJUSTMENT | FOCUS | NONEXECUTING |
| 8 | EXPOSURE ADJUSTMENT | ISO | NONEXECUTING |
| 9 | EXPOSURE ADJUSTMENT | IRIS | NONEXECUTING |
| 10 | EXPOSURE ADJUSTMENT | SHUTTER | NONEXECUTING |
| 11 | EXPOSURE ADJUSTMENT | ND | NONEXECUTING |
| 12 | CAL | IMAGE CAPTURING | NONEXECUTING |
| 13 | CAL | CALCULATION | NONEXECUTING |
| 14 | CAL | SETTING | NONEXECUTING |

FIG. 12

| ID | CATEGORY | PROCESS | REQUEST | ABNORMALITY |
|----|----------|---------|---------|-------------|
| 1 | APPARATUS CONNECTION | CAMERA | CAMERA CONNECTION CONFIRMATION | CAMERA DISCONNECTION |
| 2 | | LENS | LENS CONNECTION CONFIRMATION | LENS DISCONNECTION |
| 3 | | UNIVERSAL HEAD | UNIVERSAL HEAD CONNECTION CONFIRMATION | UNIVERSAL HEAD DISCONNECTION |
| 4 | SYNCHRONIZATION | SYNCHRONIZATION | SYNCHRONIZATION SETTING | SYNCHRONIZATION ABNORMALITY |
| 5 | ANGLE ADJUSTMENT | UNIVERSAL HEAD ANGLE | PAN/TILT SETTING | CAMERA MOVEMENT |
| 6 | | ZOOM | ZOOM SETTING | ZOOM LENS MOVEMENT |
| 7 | | FOCUS | FOCUS SETTING | FOCUS LENS MOVEMENT BODY VIBRATION |
| 8 | EXPOSURE ADJUSTMENT | ISO | ISO SETTING | ISO VALUE VARIATION |
| 9 | | IRIS | IRIS SETTING | IRIS VALUE VARIATION |
| 10 | | SHUTTER | SHUTTER SETTING | SHUTTER VALUE VARIATION |
| 11 | | ND | ND FILTER SETTING | ND FILTER VALUE VARIATION EXTERNAL LIGHT CHANGE |
| 12 | | IMAGE CAPTURING | IMAGE CAPTURING START REQUEST | CAMERA MOVEM ZOOM LENS MOVEMENT FOCUS LENS MOVEMENT BODY VIBRATION |
| 13 | CAL | CALCULATION | CAL CALCULATION | |
| 14 | | SETTING | CAL DATA SETTING | IRIS VALUE VARIATION |

F I G. 20A

| CAMERA GROUP | DISPLAY OF CAMERA SELF-CHECK STATE | | DISPLAY OF LENS SELF-CHECK STATE | | DISPLAY OF CABLE CONNECTION STATE | | | |
|---|---|---|---|---|---|---|---|---|
| | CAMERA ID | Status | LENS ID | Status | CABLE 1 ID | Status | CABLE 2 ID | Status |
| A | Cam01 | OK | Lens01 | OK | Cable1_01 | OK | Cable2_01 | OK |
| A | Cam02 | OK | Lens02 | OK | Cable1_02 | OK | Cable2_02 | OK |
| A | Cam03 | NG | Lens03 | NG | Cable1_03 | NG | Cable2_03 | NG |
| A | Cam04 | NG | Lens04 | NG | Cable1_04 | NG | Cable2_04 | NG |
| A | Cam05 | NG | Lens05 | NG | Cable1_05 | NG | Cable2_05 | NG |
| ⋮ | ⋮ | ⋮ | ⋮ | ⋮ | ⋮ | ⋮ | ⋮ | ⋮ |
| B | Cam06 | OK | Lens06 | OK | Cable1_06 | OK | Cable2_06 | OK |
| B | Cam07 | OK | Lens07 | OK | Cable1_07 | OK | Cable2_07 | OK |
| B | Cam08 | NG | Lens08 | NG | Cable1_08 | NG | Cable2_08 | NG |
| B | Cam09 | NG | Lens09 | NG | Cable1_09 | NG | Cable2_09 | NG |
| B | Cam10 | NG | Lens10 | NG | Cable1_10 | NG | Cable2_10 | NG |
| ⋮ | ⋮ | ⋮ | ⋮ | ⋮ | ⋮ | ⋮ | ⋮ | ⋮ |

F I G. 20B

| DATE | xxxYEAR xx MONTH xDAY | xxxSTADIUM | | | | | |
|---|---|---|---|---|---|---|---|
| CURRENT TIME | xx:xx | | | | | | |
| WORK NAME | | SCHEDULE | | END TIME | | WORK CONTENTS | PROGRESS RATIO |
| | | START TIME | END TIME | START TIME | END TIME | | |
| TASK A | | xx:xx | xx:xx | xx:xx | xx:xx | xx | xx |
| TASK B | | xx:xx | xx:xx | xx:xx | xx:xx | xx | xx |
| TASK C | | xx:xx | xx:xx | xx:xx | xx:xx | xx | xx |
| TASK D | | xx:xx | xx:xx | xx:xx | xx:xx | xx | xx |
| ... | | ... | ... | ... | ... | ... | ... |

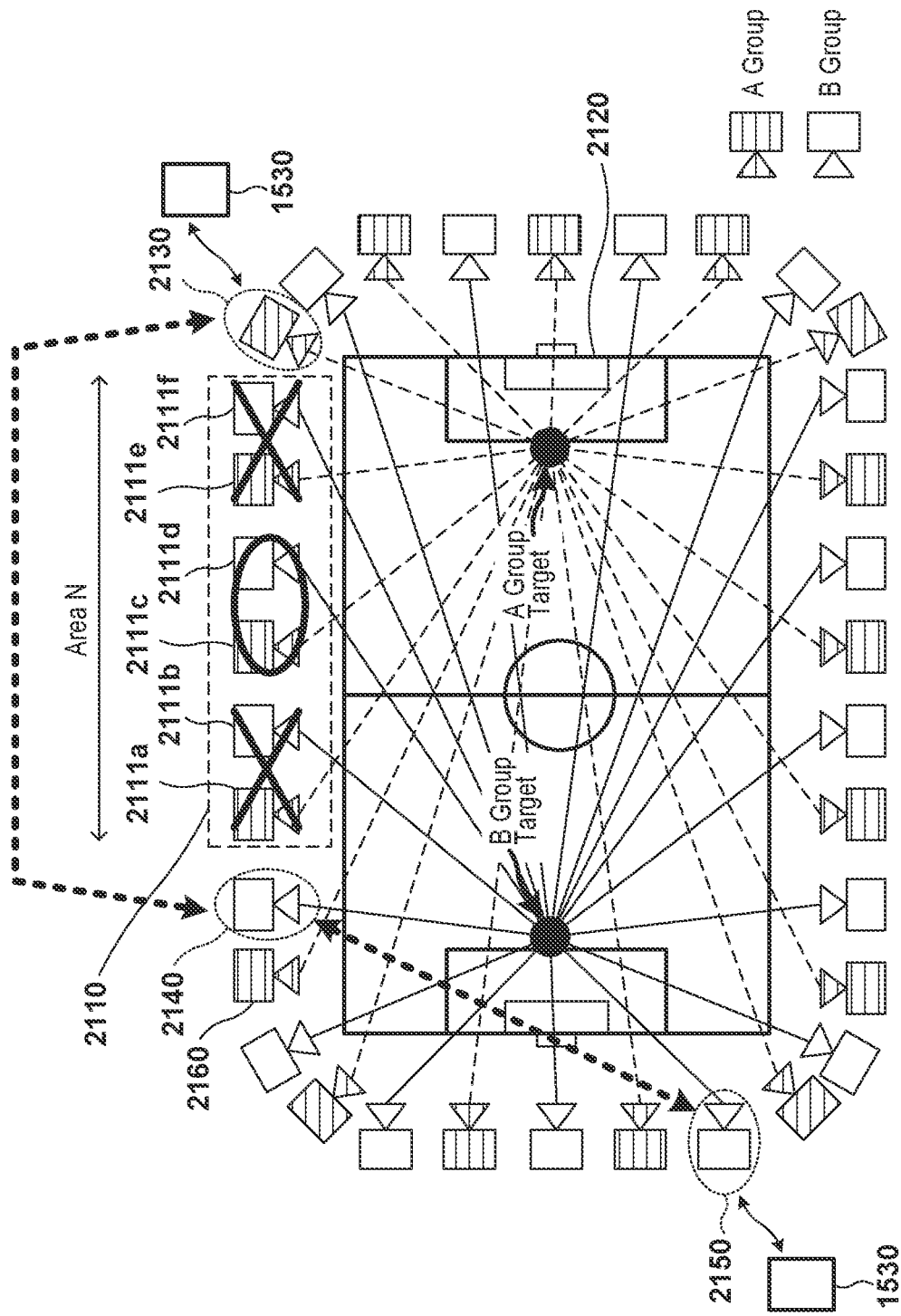

FIG. 23A

| STEP ID | COMPLETION TIME | FLAG ID LIST | LIST No. |
|---|---|---|---|
| 1000 | 10:00 | F01, F02, F03 | 01, 02, 03, ... |
| 1001 | 12:00 | F01, F02, F03 | 01, 02, 03, ... |
| 1002 | 14:00 | F01, F02, F03 | 01, 02, 03, ... |
| 1003 | 16:00 | F4 | 01, 02, 03, ... |
| 1004 | 18:00 | F5 | 01, 02, 03, ... |
| 1005 | 20:00 | F6 | 01, 02, 03, ... |
| ... | ... | ... | ... |

FIG. 23B

| FLAG ID | FLAG NAME |
|---|---|
| F01 | CAMERA GROUP |
| F02 | CAMERA ID |
| F03 | MOUNTING COMPONENT ID |
| F04 | LENS ID |
| F05 | CABLE 1_ID |
| F06 | CABLE 2_ID |
| F07 | CABLE 3_ID |
| ... | ... |

F I G. 23C

| LIST No. | CAMERA GROUP | CAMERA ID | PRIORITY | MOUNTING COMPONENT ID | LENS ID | CABLE 1_ID | CABLE 2_ID | CABLE 3_ID |
|---|---|---|---|---|---|---|---|---|
| 0001 | A | Cam01 | 2 | Plate01 | Lens01 | Cable1_01 | Cable2_01 | Cable3_01 |
| 0002 | A | Cam02 | 1 | Plate02 | Lens02 | Cable1_02 | Cable2_02 | Cable3_02 |
| 0003 | A | Cam03 | 2 | Plate03 | Lens03 | Cable1_03 | Cable2_03 | Cable3_03 |
| 0004 | B | Cam04 | 2 | Plate04 | Lens04 | Cable1_04 | Cable2_04 | Cable3_04 |
| 0005 | B | Cam05 | 1 | Plate05 | Lens05 | Cable1_05 | Cable2_05 | Cable3_05 |
| 0006 | B | Cam06 | 2 | Plate06 | Lens06 | Cable1_06 | Cable2_06 | Cable3_06 |
| ... | ... | ... | ... | ... | ... | ... | ... | ... |

FIG. 23D

| STEP ID | COMPLETION TIME | FLAG ID LIST | LIST No. |
|---|---|---|---|
| 1000 | 10:00 | F01, F02, F03 | 01, 02, 03, ... |
| 1001 | 12:00 | F01, F02, F03 | 01, 02, 03, ... |
| 1002 | 14:00 | F01, F02, F03 | 02, 05, ... |
| 1003 | 16:00 | F4 | 02, 05, ... |
| 1004 | 18:00 | F5 | 02, 05, ... |
| 1005 | 20:00 | F6 | 02, 05, ... |
| ... | ... | ... | ... |

INFORMATION PROCESSING APPARATUS, METHOD, AND NON-TRANSITORY COMPUTER-READABLE STORAGE MEDIUM

CROSS-REFERENCE TO RELATED APPLICATIONS

This application is a continuation of U.S. patent application Ser. No. 17/174,863 filed on Feb. 12, 2021, which is a Continuation of International Patent Application No. PCT/JP2019/032620, filed Aug. 21, 2019, which claims the benefit of Japanese Patent Application Nos. 2018-163623 and 2018-163621 filed Aug. 31, 2018, all of which are hereby incorporated by reference herein in their entirety.

BACKGROUND

Technical Field

The present disclosure relates to a technique of installing and operating a system using a plurality of apparatuses.

Background Art

A technique of synchronously capturing images of an object from a plurality of directions by a plurality of image capturing apparatuses installed at different positions and generating a virtual viewpoint image using the plurality of captured images obtained by this image capturing has received a great deal of attention (see PTL 1). According to the virtual viewpoint image, since viewing of images at various viewpoints different from the positions of the image capturing apparatuses is allowed, high presence can be given to a user. On the other hand, since the plurality of image capturing apparatuses are used to generate the virtual viewpoint image, many cumbersome processing procedures must be executed as compared with image capturing using a single image capturing apparatus. PTL 2 describes a UI (User Interface) capable of easily selecting a viewpoint at which a virtual viewpoint image is to be observed.

CITATION LIST

Patent Literature

PTL 1: Japanese Patent Laid-Open No. 2008-015756
PTL 2: Japanese Patent Laid-Open No. 2014-215828
PTL 3: Japanese Patent Laid-Open No. 9-139872

In the technique described in PTL 2, although the processing for allowing the user to view a prepared virtual viewpoint image can be facilitated, no explanation is made for a processing procedure for preparing the virtual viewpoint image. A state in which the virtual viewpoint image cannot be generated is not assumed, either. For this reason, the installation, removal, and operation of the plurality of image capturing apparatuses for forming a multi-camera system and other apparatuses to generate the virtual viewpoint image remain cumbersome. The load of the worker (user) cannot be reduced.

SUMMARY

The present disclosure provides a technique of improving the user convenience in the installation and operation of a multi-camera system.

An information processing apparatus according to an aspect of the present disclosure comprises one or more memories storing instructions; and one or more processors executing the instructions to: obtain a plurality of processing steps concerning a work in installation or operation of a system including a plurality of apparatuses and progress statuses of the plurality of processing steps; and cause a display to display a screen including information representing the plurality of processing steps and the progress statuses of the plurality of processing steps.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 6 is a table showing an example of workflow definition information;
FIG. 7 is a table showing an example of workflow management information;
FIG. 12 is a table showing an example of workflow definition information;
FIG. 20A is a table showing an example of screen display in a camera operation terminal;

FIG. 20B is a table showing an example of screen display in the camera operation terminal;

FIG. 21 is a view for explaining the display example of a correction plan;

FIG. 23A is a table showing an example of information held by the camera operation terminal;

FIG. 23B is a table showing an example of information held by the camera operation terminal;

FIG. 23C is a table showing an example of information held by the camera operation terminal;

FIG. 23D is a table showing an example of information held by the camera operation terminal;

DESCRIPTION OF THE EMBODIMENTS

Embodiments of the present disclosure will be described with reference to the accompanying drawings. The following embodiments are merely examples of the modes for embodying the present disclosure. The apparatus arrangements and processing procedures to be described below can be changed, as needed. For example, the functional blocks and hardware blocks which form the apparatus are not limited to the modes to be described later. Some blocks may be omitted or other blocks may be added. Alternatively, some blocks may be combined with other blocks to form one block. In addition, some processing steps may be omitted, or other steps may be added. A plurality of processing steps may be executed by one processing step.

First Embodiment

In this embodiment, a multi-camera system in which a plurality of image capturing apparatuses are installed to generate a virtual viewpoint image will be described as an example. This multi-camera system can be used in a facility such as a sports ground (stadium), a concert hall, or a studio. For the installation, removal, and operation of such a multi-camera system, in order to guide the user such that appropriate processing is performed by the user such as the worker, information such as a warning message issued when the guide is made for processing to be executed by the user or when erroneous processing is executed is easily displayed to the user. Accordingly, when performing the installation, removal, and operation of the multi-camera system, the information can prevent inappropriate processing such as user's erroneous performance of the procedure. Note that although the multi-camera system is used to generate the virtual viewpoint image, the system may be used for an application purpose except generation of the virtual viewpoint image. In this case, the "image" in this embodiment includes a still image and a moving image. The component such as the image capturing apparatus to be explained below is replaced with an arbitrary component used in an arbitrary system, so that the following argument can be applied to an arbitrary system which provides a predetermined service using a large number of components.

Figure 1:
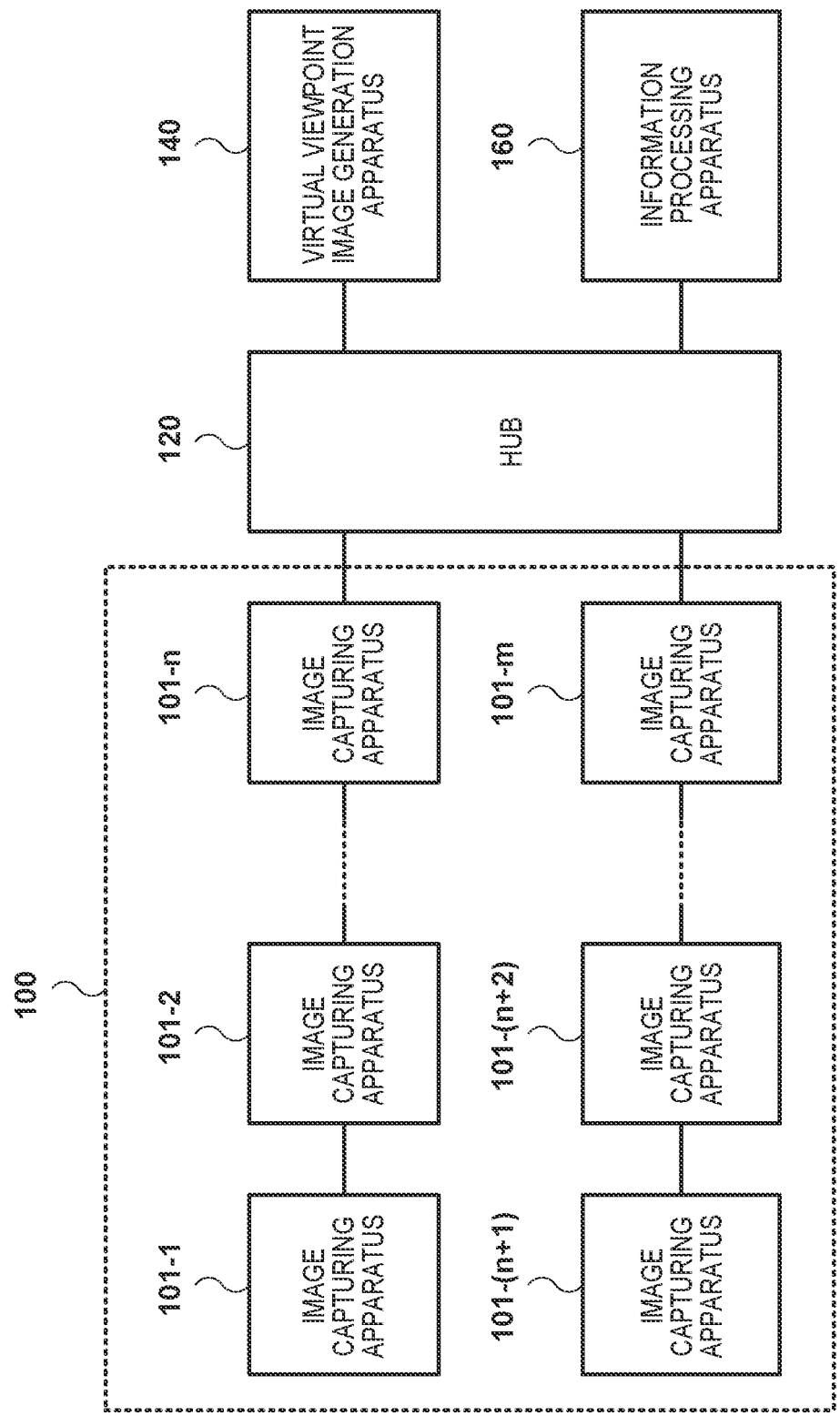
FIG. 1 is a block diagram showing the arrangement example of an information display system.

FIG. 1 shows the arrangement example of an information display system according to this embodiment. This information display system includes an image capturing apparatus group 100 including a plurality of image capturing apparatuses 101-1 to 101-m, a HUB 120, a virtual viewpoint image generation apparatus 140, and an information processing apparatus 160. The respective apparatuses are communicably connected to each other via, for example, a transmission cable for transmitting an image and control information. The transmission cable is, for example, a cable of GbE (Gigabit Ethernet) or 10 GbE complying with the Ethernet© standard. However, the present disclosure is not limited to this. Any other type of cable may be used. In addition, the respective apparatuses may perform wireless communication, wired communication, or both wireless communication and wired communication.

As described above, the image capturing apparatus group 100 includes the plurality (m) of image capturing apparatuses (image capturing apparatuses 101-1 to 101-m). If a specific image capturing apparatus need not be designated, these image capturing apparatuses are referred to as an image capturing apparatus 101-x. Note that a value such as m and x affixed to 101 is an integer. The image capturing apparatuses 101-x located adjacent to each other (for example, the image capturing apparatus 101-1 and the image capturing apparatus 101-2) can be directly connected to each other via the transmission cable. Note that the two image capturing apparatuses 101-x directly connected need not be physically adjacent to each other, and another image capturing apparatus 101-x may be arranged between these two image capturing apparatuses 101-x. For example, the plurality of image capturing apparatuses may be classified into a plurality of groups in which the image capturing targets (viewpoints) are different. In this case, the image capturing apparatuses 101-x in a group are directly connected to each other, and the image capturing apparatuses 101-x in different groups are not directly connected to each other. The image capturing apparatus 101-x transmits, to the virtual viewpoint image generation apparatus 140 and the information processing apparatus 160, the captured image and the processing result of a request received from the information processing apparatus 160. The image capturing apparatus 101-2 is connected to the image capturing apparatus 101-1, as shown in FIG. 1, and at the same time directly connected to the adjacent image capturing apparatus 101-3 (not shown) on the side opposite to the image capturing apparatus 101-1. In this manner, the image capturing apparatus 101-k is directly connected to two adjacent image capturing apparatuses, that is, the image capturing apparatus 101-(k−1) and the image capturing apparatus 101-(k+1). Note that this does not apply to the image capturing apparatus (for example, the image capturing apparatus 101-1) located at the end portion of this connection and the image capturing apparatus (for example, the image capturing apparatus 101-n) directly connected to the HUB 120. That is, these image capturing apparatuses are not connected to two other image capturing apparatuses, but are connected to any other image capturing apparatus. In this manner, the plurality of image capturing apparatuses 101-x are connected to each other in a daisy chain. Note that the plurality of image capturing apparatuses 101-x are classified into the groups for the image capturing target described above, and the image capturing apparatuses in each group are connected in a daisy chain. In this case, the image capturing apparatuses 101-x belonging to the first group are arranged to be connected to the image capturing apparatuses 101-x of the second group different from the first group via the HUB 120. In the example shown in FIG. 1, there exit two such groups, and different daisy chains are formed for the group of the image capturing apparatuses 101-1 to 101-n and the group of the image capturing apparatus 101-(n+1) to 101-m. Note that this connection form is merely an example, and the image capturing apparatuses of different groups may be connected by one daisy chain. In addition, FIG. 1 shows the example in which the number of groups is two. However, grouping need not be performed, and all the image capturing apparatuses may form one daisy chain, or three or more groups may be formed. In addition, the interconnection of the plurality of image capturing apparatuses 101-x need not be performed by the daisy chain form, but may be performed by an arbitrary form such as a ring type, a mesh type, star type, bus type, tree type, or a combination thereof. This grouping may be performed by any other reference such that image capturing apparatuses arranged physically close to each other belong to, for example, the same group.

Figure 2:
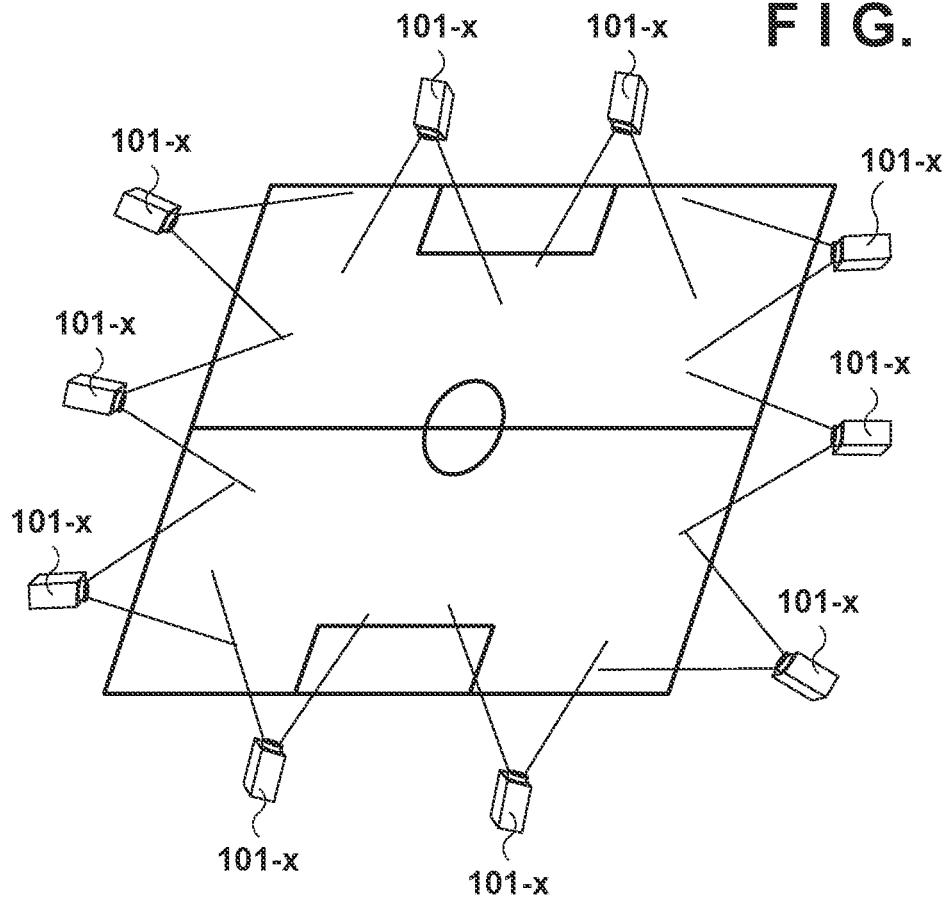
FIG. 2 is a view showing the arrangement of image capturing apparatuses.

The image capturing apparatuses 101-x are arranged to surround a sports ground such as a soccer field or a specific object. FIG. 2 is a view showing an example of the arrangement of the image capturing apparatuses 101-x. In the example of FIG. 2, the plurality of image capturing apparatuses 101-x are arranged to capture all or partial range of the sports ground such as a soccer field.

Figure 3:
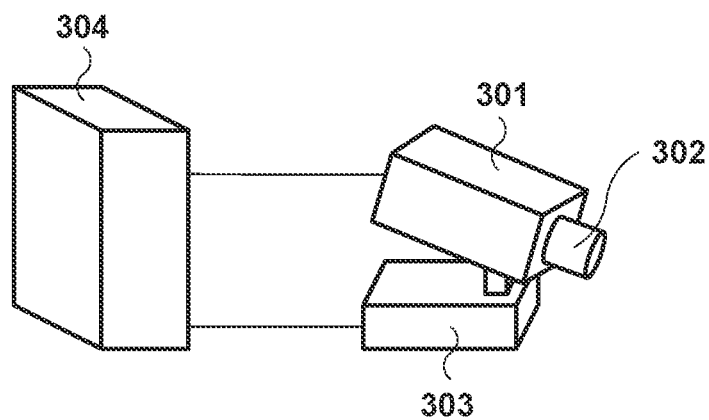
FIG. 3 is a view showing the arrangement example of the image capturing apparatus.

FIG. 3 shows the arrangement example of the image capturing apparatus 101-x. The image capturing apparatus 101-x includes a camera 301, a lens 302, a universal head 303, and an image processing apparatus 304. The camera 301 is, for example, a digital camera and captures the image by cooperation with the mounted lens 302 to generate image data. The camera 301 is connected to the image processing apparatus 304 via an SDI (Serial Digital Interface) cable. The camera 301 receives a control signal and a synchronization signal from the image processing apparatus 304 and transmits image data obtained by image capturing to the image processing apparatus 304. The camera 301 performs image capturing based on the synchronization signal received from the image processing apparatus 304. Note that the synchronization signal is a signal for performing image capturing at the same timing of the plurality of image capturing apparatuses 101-x, thereby performing image capturing at the same timing or almost the same timing of all the image capturing apparatuses 101-x. Note that the cable between the camera 301 and the image processing apparatus 304 can be a cable other than the SDI cable as far as it can transmit the control signal, the synchronization signal, and the image signal. The universal head 303 adjusts the angle of the body of the camera 301. In addition, the universal head 303 is connected to the image processing apparatus 304 via, for example, a serial cable. The universal head 303 receives the angle data in the pan and tilt directions from the image processing apparatus 304 and adjusts the angle of the body of the camera 301 based on the received angle data. Note that the cable between the universal head 303 and the image processing apparatus 304 can be a cable other than the serial cable as far as the cable can transmit the angle data. The image processing apparatus 304 obtains the control signal from the information processing apparatus 160 and outputs the control signals to the camera 301, the lens 302, and the universal head 303. The image processing apparatus 304 transmits, to the virtual viewpoint image generation apparatus 140 via the transmission cable, the captured image received from the camera 301. In addition, the image processing apparatus 304 transmits, to the information processing apparatus 160, a control response signal indicating that processing of the output control signal ends normally or abnormally.

Referring back to FIG. 1, the virtual viewpoint image generation apparatus 140 is connected to the HUB 120, arranged to be communicable with the image capturing apparatus 101-x via the HUB 120, and accumulates images captured by the image capturing apparatus 101-x. The virtual viewpoint image generation apparatus 140 can generate three-dimensional shape data of an object and the background based on the accumulated images and prepare to generate a virtual viewpoint image. When the virtual viewpoint information is input by an operation of a user terminal, the virtual viewpoint image generation apparatus 140 generates a virtual viewpoint image corresponding to the input virtual viewpoint information by using the images captured by the plurality of image capturing apparatuses 101-x. The virtual viewpoint information includes position information and direction information and is information for designating a specific position at which the object is observed and a specific direction from which the object is observed. The position information is information indicating a relative position (for example, the front-and-back direction, the right-and-left direction, and the position in the right-and-left direction if a predetermined position is given as a reference position) with respect to the predetermined position such as the center of the sports ground. The direction information is information indicating the direction (for example, the angles from the respective axes in a three-dimensional orthogonal coordinate system having the front-and-back direction, the right-and-left direction, and the vertical direction as axes if the predetermined direction is given as the reference direction) from the predetermined position. The virtual viewpoint image generation apparatus 140 is, for example, a server apparatus. The virtual viewpoint image generation apparatus 140 has, for example, a database function of saving images captured by the plurality of image capturing apparatuses 101-x and a function of managing the information of the positions where the image capturing apparatuses 101-x are arranged and the directions in which image capturing is performed. In addition, the virtual viewpoint image generation apparatus 140 has an image processing function of generating the virtual viewpoint image using the saved images based on the managed information. Note that the database function of the virtual viewpoint image generation apparatus 140 can hold, as background image data in advance, an image obtained by capturing the scene of a competition venue where no object is present, such as the scene of the competition venue before the start of the competition.

The information processing apparatus 160 is connected to the HUB 120 and arranged to communicate with the image capturing apparatus 101-x and the virtual viewpoint image generation apparatus 140 via the HUB 120. The information processing apparatus 160 receives the image captured by the image capturing apparatus 101-x and the state information of the image capturing apparatus 101-x and executes processing for displaying the received image and information on the display screen. In addition, the information processing apparatus 160 also receives the state information of the virtual viewpoint image generation apparatus 140 and executes processing for displaying the received information on the display screen. The viewer of this system can regularly monitor the states of the image capturing apparatus group 100 and the virtual viewpoint image generation apparatus 140 using the captured images and the like displayed on the display screen by the processing of the information processing apparatus 160. In addition, the information processing apparatus 160 can display a workflow indicating a work to be executed from the installation of the system to the image capturing and execute processing for displaying processing progress information indicating the completion, non-completion, and processing in progress of the work. In addition, the information processing apparatus 160 can execute processing for displaying information indicating that the completed processing is in the normal or abnormal state. The display contents of these pieces of information will be described later.

The HUB 120 relays communication between the image capturing apparatus group 100, the virtual viewpoint image generation apparatus 140, and the information processing apparatus 160. The HUB 120 transfers, for example, the captured images from the plurality of image capturing apparatuses 101-x to the virtual viewpoint image generation apparatus 140 and the information processing apparatus 160. Accordingly, the virtual viewpoint image generation apparatus 140 and the information processing apparatus 160 can obtain the identical captured images.

Figure 4:
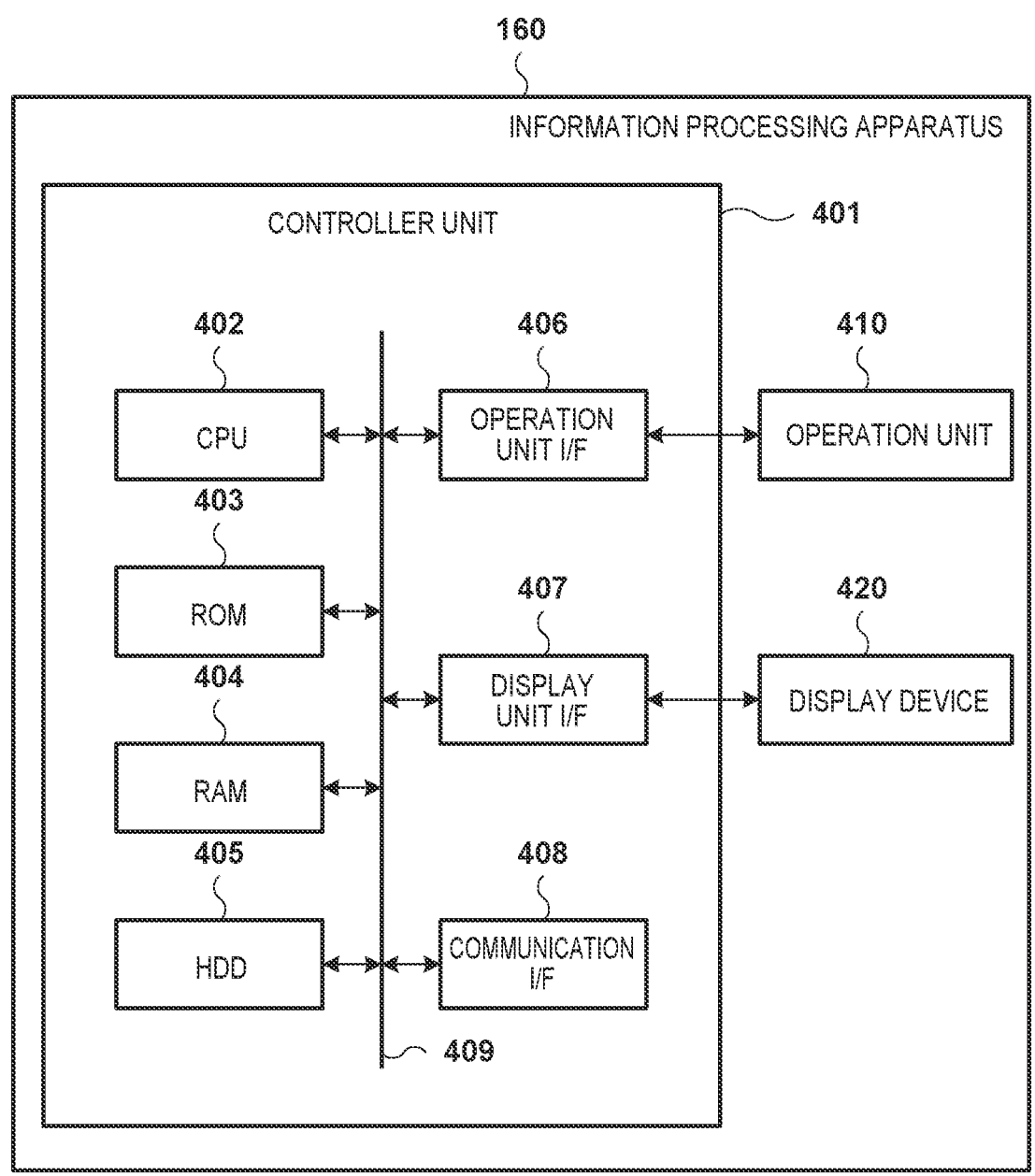
FIG. 4 is a block diagram showing the hardware arrangement example of an information processing apparatus.

Next, the arrangement example of the information processing apparatus 160 will be described below. FIG. 4 is a block diagram showing the hardware arrangement example of the information processing apparatus 160. The information processing apparatus 160 is configured to include, as the hardware arrangement, for example, a controller unit 401, an operation unit 410, and a display device 420. Note that the information processing apparatus 160 may be arranged not to include, for example, the operation unit 410 and the display device 420. For example, the information processing apparatus 160 may be configured to accept a command indicating a user operation from an operation device such as an external keyboard, execute the processing, and output the screen data for displaying the result on the screen such as an external display. In addition, the information processing apparatus 160 may be a server or the like arranged on the network, receive the operation command from at least one operation terminal via the network, and transmit the screen data to at least one display via the network.

The controller unit 401 is configured to include, for example, a CPU 402, a ROM 403, a RAM 404, an HDD 405, an operation unit I/F 406, a display unit I/F 407, and a communication I/F 408. Note that HDD is an acronym of Hard Disk Drive and I/F is the abbreviation of the interface. The CPU 402, the ROM 403, the RAM 404, the operation unit I/F 406, the display unit I/F 407, and the communication I/F 408 are connected to each other via a system bus 409.

The CPU 402 activates an OS (Operating System) by a boot program stored in the ROM 403. The CPU 402 executes application programs stored in the HDD 405 and the like on the OS. The CPU 402 implements various kinds of processing by executing the application programs. The RAM 404 is used as a work area or the like of the CPU 402. The HDD 405 stores the above-mentioned application programs.

The operation unit I/F 406 is an interface for performing user operation control by accepting information indicating the user operation from the operation unit 410 and outputting the information to the operation unit 410, as needed. The operation unit I/F 406 obtains, from the operation unit 410, information indicating the user operation of a system administrator which is accepted by the operation unit 410, and outputs this information to the CPU 402. The operation unit 410 is configured by an apparatus which accepts the user operation using, for example, a mouse and a keyboard. The operation unit 410 is not limited to this. An arbitrary apparatus which accepts the user operation, such as a sensor for detecting the gesture and the like of sight of the user and a sensor for detecting the movement of the operation element may be used as the operation unit 410.

The display unit I/F 407 is an interface for performing screen display control by outputting image data to be displayed on the display device 420 to the display device 420 and accepting the information from the display device 420, as needed. The display device 420 can be a computer display. Note that the operation unit 410 and the display device 420 may be arranged by, for example, one device such as a touch panel display. In addition, in this embodiment, although the information presentation is performed by screen display, information presentation may be performed by various methods such as audio output and vibration output. In this case, the display unit I/F 407 can output information of the audio data to be output and the vibration pattern to an external loudspeaker and a vibrator.

The communication I/F 408 is an interface connected to another device via, for example, a transmission cable to perform communication with the other device. The communication I/F 408 performs information input/output by communication with an external apparatus (for example, the user terminal, and the HUB 120 and the information processing apparatus 160 in FIG. 1). The communication I/F 408 can be a wired communication I/F, but may be a wireless communication I/F.

Figure 5:
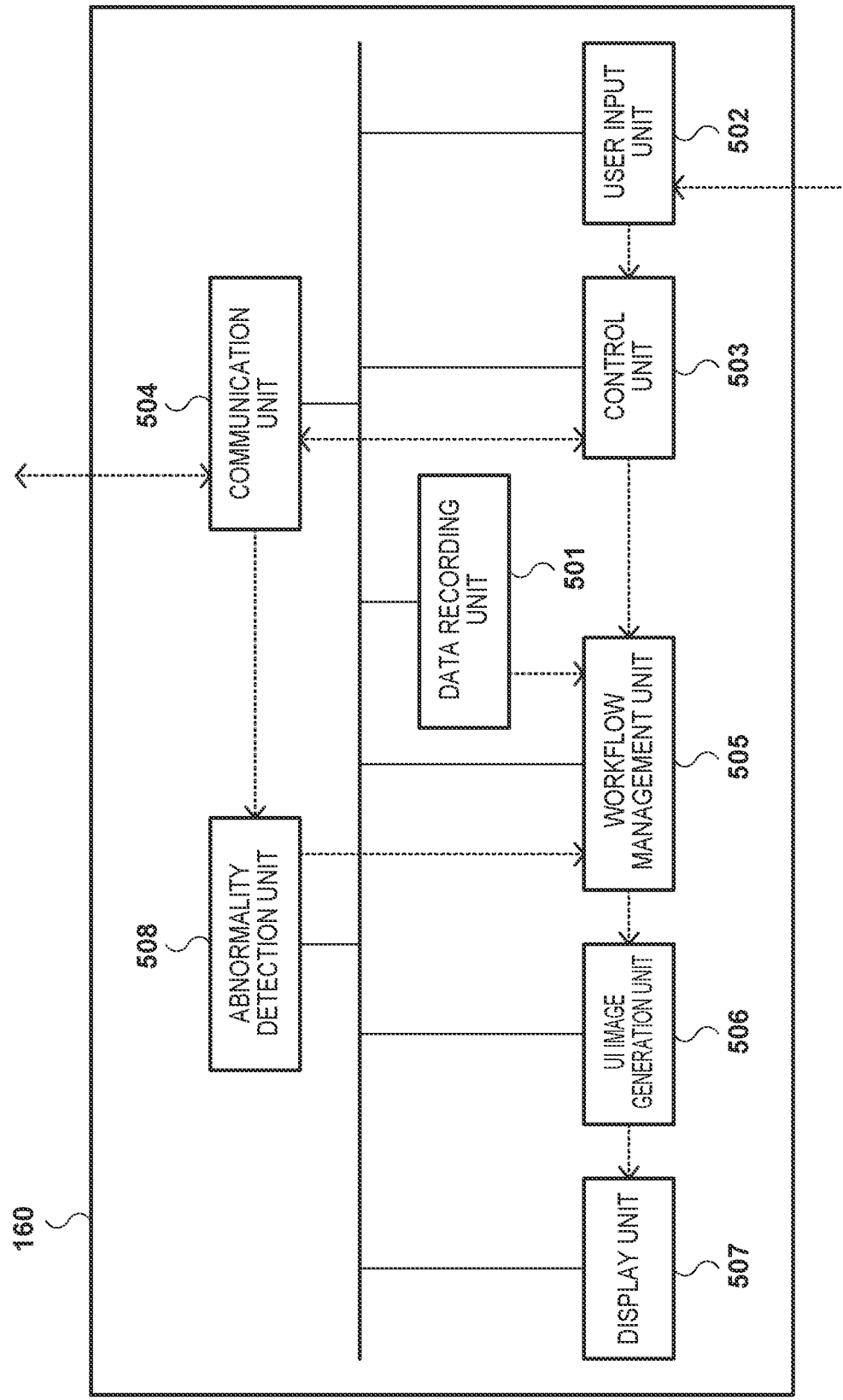
FIG. 5 is a block diagram showing the functional arrangement example of the information processing apparatus.

FIG. 5 shows the functional arrangement example of the information processing apparatus 160. The information processing apparatus 160 includes a data recording unit 501, a user input unit 502, a control unit 503, a communication unit 504, a workflow management unit 505, a UI image generation unit 506, a display unit 507, and an abnormality detection unit 508. These functional units are logically connected to each other and can exchange data under the control of the control unit 503. Note that the data recording unit 501 records data in the HDD 405, and the control unit 503, the workflow management unit 505, and the UI image generation unit 506 can perform processing by the processing of the CPU 402. In addition, the user input unit 502 obtains information indicating the user input of the operation unit I/F 406, and the communication unit 504 performs communication with an external apparatus by the communication I/F 408. The display unit 507 displays the information on the display device 420 via the display unit I/F 407.

The data recording unit 501 holds the workflow definition information indicating the procedures from the installation of the system to the image capturing and progress statuses. The workflow definition information includes any information of at least one of an "ID", "category", "process", and "request". In this case, the "category" indicates an item obtained by grouping the procedures from the installation to the image capturing. The "process" indicates a processing item belonging to the category. The "request" shows the details of processing corresponding to the process and indicates the processing contents requested from the information processing apparatus 160 to the image capturing apparatus 101-x. In addition, the "ID" is identification information uniquely assigned to a combination of these items and is data corresponding to the process execution order. The "ID" can be assigned with "1" for the process to be executed first and can be a value increasing in the order of "2", "3", . . . .

FIG. 6 shows an example of the workflow definition information. The workflow definition information in this example defines the contents and order of 14 processing operations from the installation of the image capturing system to the image capturing. Each processing operation is defined as a "process", and one "category" includes a group of one or more "processes". The "request" is defined as the control contents requested from the information processing apparatus 160 to the image capturing apparatus 101-x. As shown in FIG. 6, the workflow definition information of this example defines categories of "apparatus connection", "synchronization", "viewing angle adjustment", "exposure adjustment", and "calibration (CAL)".

As the apparatus connection category, the group of processes including "camera", "lens", and "universal head" is defined. These processes are processing operations for confirming that the camera, the lens, and the universal head are connected to each of the image capturing apparatuses 101-x. In the processing operations, processing for simply confirming that an apparatus is present and connected can be executed. However, another process such as confirmation of the types of apparatuses for each image capturing apparatus 101-x may be executed. For example, if a plurality of types of cameras are used in an image capturing system, confirmation processing such that the "camera of the type A is connected to the image capturing apparatus 101-1" may be executed. In addition, the apparatus ID may be confirmed for each image capturing apparatus 101-x. For example, it may be confirmed that a serial ID is uniquely defined for each camera used in the image capturing system, and the camera of ID=001 is connected to the image capturing apparatus 101-1. Since the virtual viewpoint image capturing system handles a large number of apparatuses, it is very important to manage the components. Accordingly, the information processing apparatus 160 can confirm by these processes the number of apparatuses and whether a desired component is connected.

The "synchronization" process is defined for the synchronization category. In order to generate a virtual viewpoint image, the cameras 301 of all the image capturing apparatuses 101-x must perform image capturing synchronously. For this purpose, the information processing apparatus 160 sends a synchronization signal output request to the image processing apparatuses 304 of all the image capturing apparatuses 101-x, and a large number of cameras 301 output a synchronization signal for synchronization.

The group of processes including "universal head angle", "zoom", and "focus" is defined for the viewing angle adjustment category. In order to generate a virtual viewpoint image, the plurality of cameras 301 must capture the images of the same area without blurring. For this purpose, in these processes, the information processing apparatus 160 outputs a request signal to designate the direction of the camera by adjusting the angle of the universal head, determine the image capturing range of the camera by zoom adjustment, and output a request signal for canceling the blur by focus adjustment.

A group of processes including "ISO", "iris", "shutter", and "ND" is defined for the exposure adjustment category. In order to generate a virtual viewpoint image, the captured images of the cameras 301 of all the image capturing apparatuses 101-x must have the same lightness value. For this purpose, the information processing apparatus 160 outputs a signal for requesting the adjustment for the exposure by these processes.

A group of processes including "image capturing" "calculation", and "setting" is defined for the calibration (CAL) category. In order to generate a virtual viewpoint image, a specific position at which the object is observed and a specific direction from which the object is observed of each of the cameras 301 of all the image capturing apparatuses 101-x, and the lens distortion of each camera must be managed. This management data is called the "CAL parameter" hereinafter. The CAL parameters can be specified by calculations upon performing image capturing at the same time by all the cameras 301, analyzing the captured images, and extracting the positions of the feature points. The CAL parameters can be calculated using a method of mapping three-dimensional points expressed by the world coordinate system on images. The information processing apparatus 160 performs settings of the image processing apparatuses 304 of all the image capturing apparatuses 101-x by using the calculated CAL parameters.

Note that the 14 processes and 5 categories are defined in this embodiment, but the numbers of processes and categories and their contents can be arbitrarily set and are not particularly limited. For example, the above processing operations are related to the system for generating the virtual viewpoint image.

However, processes and categories necessary for a multi-camera system not related to the virtual viewpoint image to achieve its purpose may be defined. In addition, the plurality of image capturing apparatuses need not be used. The processes and categories may be defined to install and operate the system using a large number of components. Note that the information processing apparatus 160 need not incorporate the data recording unit 501. The data recording unit 501 may be implemented by an external recording apparatus of the information processing apparatus 160. In addition, the data recording unit 501 may be implemented in each image capturing apparatus 101-x for the portion which holds the information related to the image capturing apparatus 101-x. The data recording unit 501 may be divided and implemented into a plurality of apparatuses on the function basis in, for example, the image capturing apparatus 101-x and the information processing apparatus 160.

Referring back to FIG. 5, the user input unit 502 accepts user operation information accepted by the operation unit 410 and outputs it to the control unit 503.

The control unit 503 outputs a control instruction to each unit of the information processing apparatus 160. For example, based on the operation information from the user input unit 502, the control unit 503 decides the request contents to the image capturing apparatus 101-x and outputs request contents to the communication unit 504. In addition, in order to display the progress status of the system for image capturing on the UI (User Interface) screen, the control unit 503 transmits the request contents similarly to the workflow management unit 505. In addition, the control unit 503 can receive, through the communication unit 504, the request response information indicating the processing result of the request output to the image capturing apparatus 101-x, and output this request response information to the workflow management unit 505.

The communication unit 504 obtains the request information from the control unit 503, converts this request information into a signal format capable of performing transmission to another apparatus, and transmits the converted signal to each image capturing apparatus 101-x. In addition, the communication unit 504 receives a signal from each image capturing apparatus 101-x, extracts the request response information included in this signal, and outputs the extracted request response information to the control unit 503. In addition, the communication unit 504 obtains apparatus information from the signal received from each image capturing apparatus 101-x and outputs this apparatus information to the abnormality detection unit 508. In this case, the apparatus information can include information indicating any one of the setting value, external sensor value, and gyro sensor value of the image capturing apparatus.

The workflow management unit 505 obtains the request information and the request response information from the control unit 503, updates the workflow management information in accordance with these pieces of information, and then transmits the updated workflow management information to the UI image generation unit 506. FIG. 7 shows an example of workflow management information. The workflow management information includes information indicating any one of four states, that is, non-execution, execution in progress, normal end, and abnormal end for each process. The state transition will be described later.

The UI image generation unit 506 generates a UI image based on the workflow management information obtained from the workflow management unit 505 and outputs it to the display unit 507.

The display unit 507 overwrites the display image output from the UI image generation unit 506 on a frame buffer (not shown). The display unit 507 reads out the display image stored in the frame buffer at a predetermined refresh rate and displays the display image on the display device 420.

The abnormality detection unit 508 obtains the apparatus information from the communication unit 504 and monitors whether there is an apparatus which operates abnormally. If the abnormality detection unit 508 detects the occurrence of an apparatus abnormality, the abnormality detection unit 508 outputs an abnormality notification to the workflow management unit 505.

(Example of Procedure of Processing when Installing and Operating System)

An example of the procedure of processing executed by the information processing apparatus 160 will now be described below. In this processing, the information processing apparatus 160 displays a UI screen for supporting each user to execute the procedure from the installation of a large number of image capturing apparatus for generating the virtual viewpoint image to the image capturing.

Figure 8:
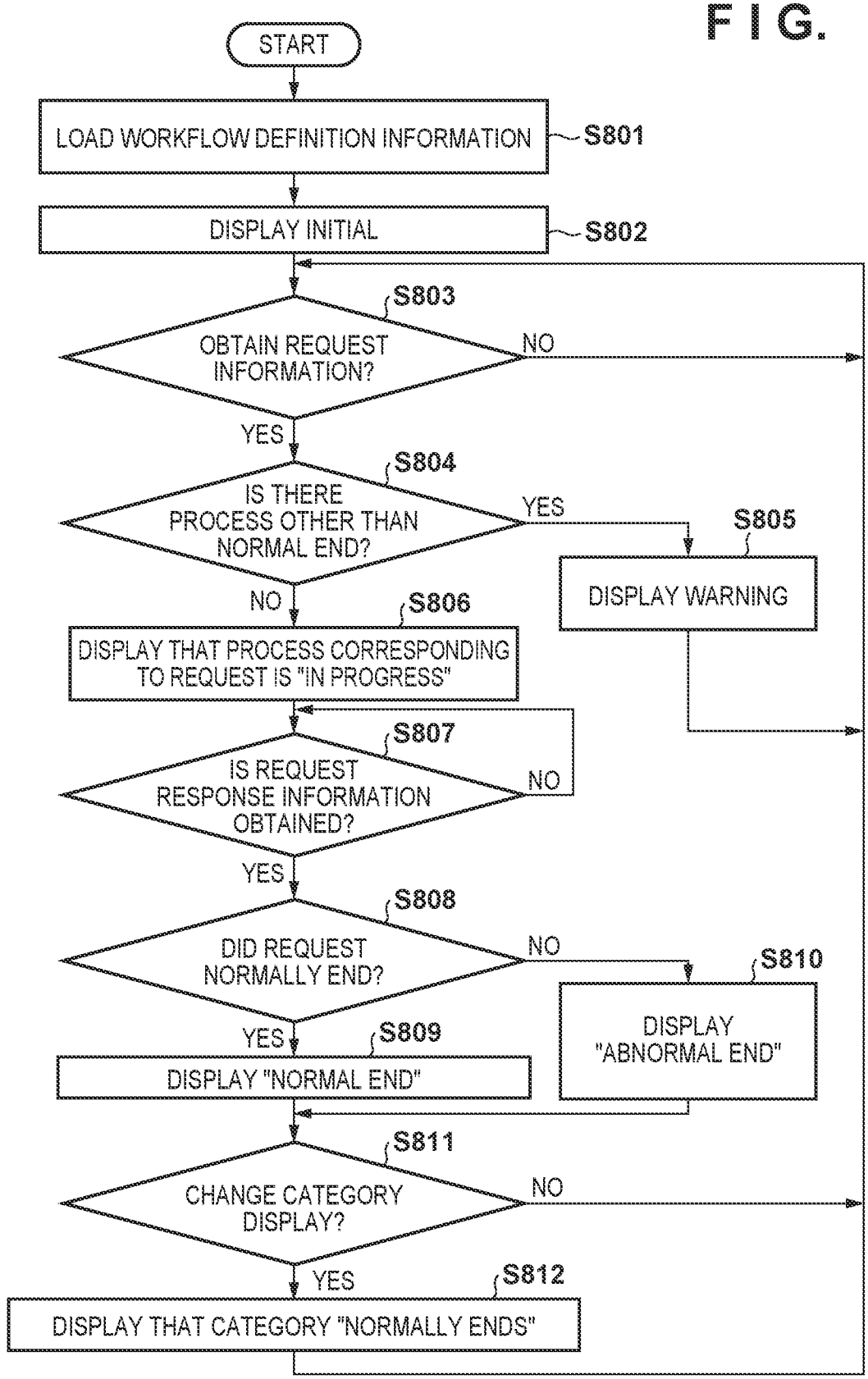
FIG. 8 is a flowchart showing an example of processing of workflow UI display.

FIG. 8 shows an example of this processing procedure. This processing can be implemented by causing the CPU 402 to execute the program stored in the HDD 405. Note that the processing procedure will be described using the functional arrangement shown in FIG. 5.

In this processing, the workflow management unit 505 loads the workflow definition information from the data recording unit 501 (S801) and generates the workflow management information. The workflow management unit 505 extracts, for example, the category and process information from the workflow definition information, sets each process state to the "non-execution", and manages it. After that, the workflow management unit 505 outputs the generated workflow management information to the UI image generation unit 506. The UI image generation unit 506 generates a workflow UI based on the workflow management information, and displays it (S802). Note that the workflow definition information may be manually input by the user operation. In addition, the workflow management information corresponding to each of the plurality of systems may be defined in advance and recorded in the data recording unit 501, and the workflow management unit 505 may read out the workflow definition information corresponding to the system selected by the user from the plurality of systems. Alternatively, the workflow management unit 505 may read out, from the data recording unit 501, the workflow management information corresponding to, for example, a predetermined application in response to the activation of the predetermined application. Alternatively, if the information processing apparatus 160 is exclusively used for a predetermined system, the workflow management unit 505 may read out the predetermined workflow management information from the data recording unit 501 upon activating the information processing apparatus 160 without accepting any user operation.

Figure 9:
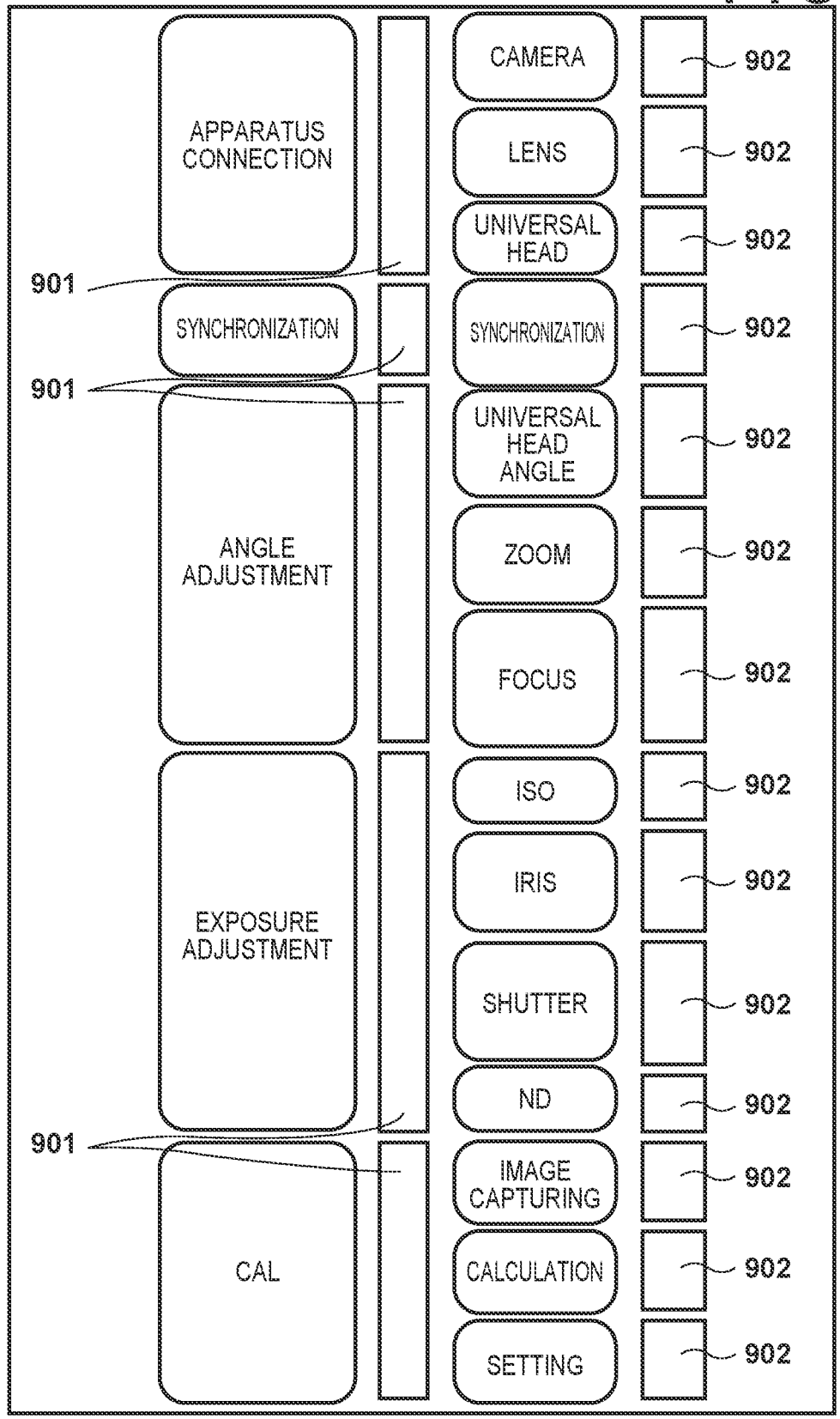
FIG. 9 is a view showing an example of a workflow UI.

FIG. 9 is an example of the workflow UI display at the time when the workflow management information is generated based on the workflow definition information in FIG. 6. This workflow UI is initially displayed in S802. Of the display of FIG. 9, the upper stage displays a list of category information included in the workflow. A list of process information included in the workflow is displayed on the lower stage. These pieces of process information are displayed as lower layers of the categories to which the processes belong. Status bars 901 indicating the progress states of the processes are arranged as lower layers between the category information and the process information. Status bars 902 indicating the progress states of the processes are arranged as the lower layers of the pieces of process information. These status bars express the four states, that is, non-execution, execution in progress, normal end, and abnormal end. Note that in the workflow UI, only categories may be displayed in the initial display, and, if a given category is selected, processes belonging to the given category may be displayed. That is, for example, in some cases, the user selects a category which is not shifted to the normal end during execution and grasps the status, but need not know details of a category which ends normally. In this case, the display can be simplified, and the user can easily and roughly grasp the state. As for the display of the progress state, as shown in FIG. 9, an area indicating the progress status such as a status bar may be prepared separately from an area indicating the names of the categories and processes. However, the present disclosure is not limited to this. For example, the character/frame color/size indicating the category or process may be changed, or flickering display may be used. As far as the display for allowing the user to determine the state is performed, status bar display need not be used.

Referring back to FIG. 8, the workflow management unit 505 waits for arrival of the request information from the control unit 503 (S803). As an example, a case of the progress status in which the process normally ends until the lens process of the apparatus connection will be described based on an example of the workflow management information shown in FIG. 7. If the workflow management unit 505 obtains the request information from the control unit 503 (YES in S803), it confirms the presence of processes ("non-execution", "execution in progress", and "abnormal end") other than the process of "normal end" among the processes which are completed at this time (S804). If the workflow management unit 505 determines that a process which ends abnormally is present (YES in S804), a warning UI is displayed (S805), and the process shifts to a request waiting state (S803). For example, if the workflow management unit 505 obtains the request information of synchronization setting from the control unit 503, the workflow management unit 505 confirms the current progress by the workflow management information. If the workflow management unit 505 detects that the universal head process is "non-execution", it determines the presence of a process other than the process which ends normally. The workflow management unit 505 sends a request for displaying the warning UI to the UI image generation unit 506.

Figure 10:
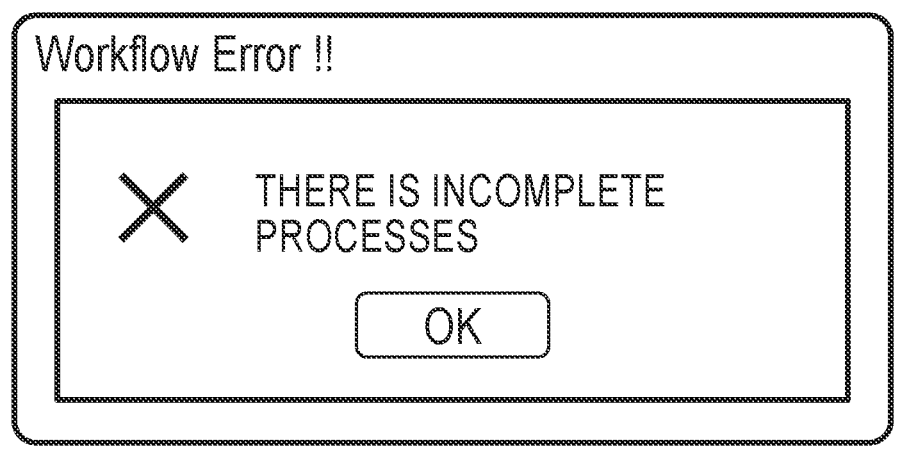
FIG. 10 is a view showing an example of a warning UI.

FIG. 10 shows an example of warning UI display. When the operator of the information processing apparatus 160 visually checks this warning UI, he/she can recognize the present of the process which does not end. Accordingly, the operator can execute the workflow procedures without any omission. Note that the display contents of the warning UI are not limited to the contents shown in FIG. 10 as far as the user can recognize the presence of the process which does not end. In addition, this notification may be performed by audio guidance or a beep tone and need not be performed by the UI display.

On the other hand, if all the processes to be completed normally end (NO in S804), the workflow management unit 505 updates the state of the process corresponding to the request information to a state in progress. The workflow management unit 505 then sends a request to the UI image generation unit 506 to display that this process is in progress (S806). After that, the workflow management unit 505 waits for reception of request response information from the control unit 503 (S807). If the workflow management unit 505 receives the request response information (YES in S807), it determines based on this request response information whether the request in S803 normally ends (S808). If the workflow management unit 505 determines that the request normally ends (YES in S808), it changes information of the state of the process corresponding to this request to a normal end state. The workflow management unit 505 then sends a request to the UI image generation unit 506 to display that the process "normally ends" (S809). On the other hand, if the workflow management unit 505 determines that this request in S803 abnormally ends (NO in S808), the workflow management unit 505 changes the information of the state of the process corresponding to this request to the abnormal end state. In this case, the workflow management unit 505 sends a request to the UI image generation unit 506 to display that this process "abnormally ends" (S810). After that, the workflow management unit 505 determines whether the category display is to be changed (S811). If the workflow management unit 505 determines that the display is to be changed (YES in S811), it sends a request to the UI image generation unit 506 to display that the category corresponding to the request normally ends (S812). On the other hand, if the workflow management unit 505 determines that the category display is not be changed (NO in S811), it returns to the request information waiting state.

Figure 11A:
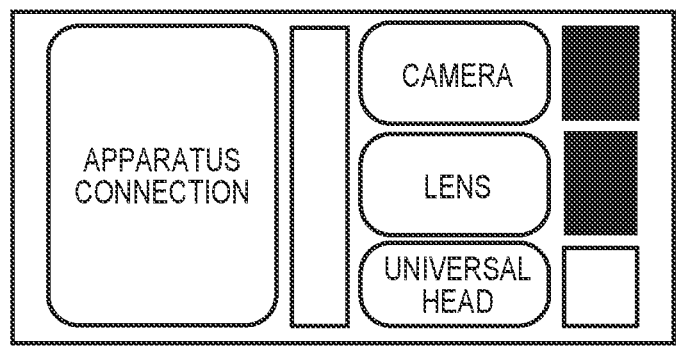
FIG. 11A is a view showing an example of the workflow UI.
Figure 11B:
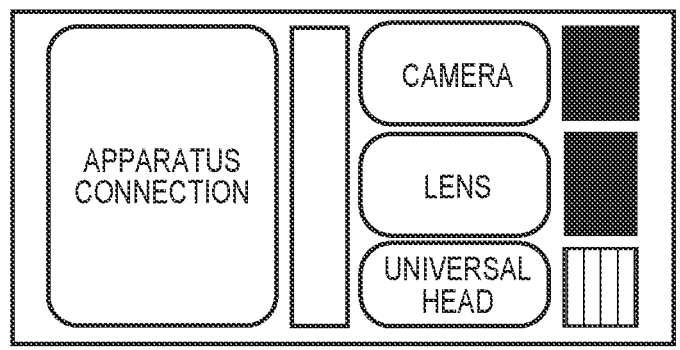
FIG. 11B is a view showing an example of the workflow UI.
Figure 11C:
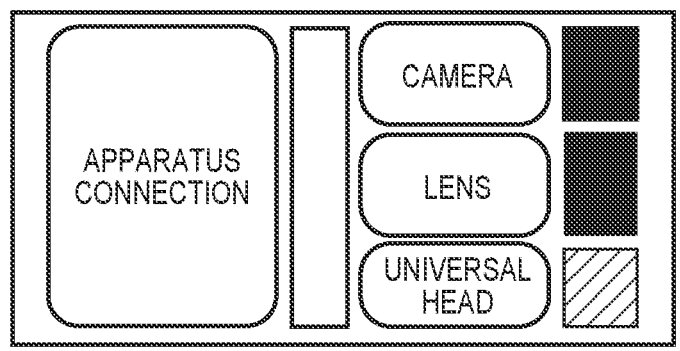
FIG. 11C is a view showing an example of the workflow UI.
Figure 11D:
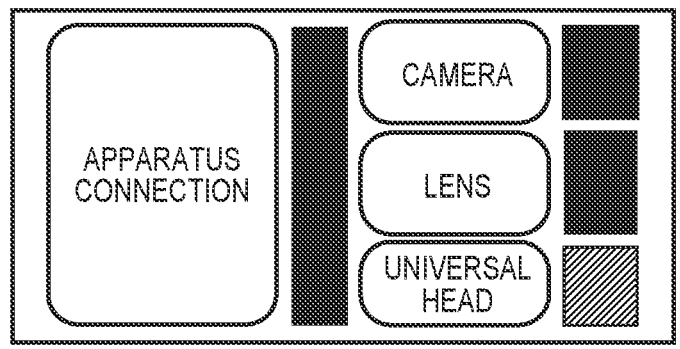
FIG. 11D is a view showing an example of the workflow UI.

FIGS. 11A to 11D show an example of workflow UI display. Note that for the descriptive simplicity, FIGS. 11A to 11D illustrate only the example of UI display of the apparatus connection category. FIG. 11A shows the progress status in which the operation normally ends until the lens process, and the universal head process is not executed yet. A state in which the progress status of non-execution is displayed by a white status bar. FIG. 11B shows a display example in which the universal head process is transitioned to the progress status of the process in progress after the universal head connection confirmation request is obtained from the control unit 503. If the progress state indicates the process in progress, the status bar flickers in, for example, a first predetermined color (for example, gray). Next, FIG. 11C shows a display example in which the progress status of the universal head process is transitioned to the abnormal end in accordance with the fact that the process abnormally ends due to the request response information obtained from the control unit 503. If the progress state indicates the abnormal end, the status bar is displayed in, for example, a second predetermined color (for example, red). By this display, the operator of the information processing apparatus 160 can recognize that the universal head connection could not be made. The operator checks whether the cable between the image processing apparatus 304 and the universal head 303 is connected, or whether the universal head is powered on. FIG. 11D shows a display example in which the progress status of the universal head process formally ends in accordance with the fact that the process normally ends due to the request response information obtained from the control unit 503. If the progress state indicates the normal end, the status bar is displayed in the same color as the status bar of the normally ended process of the camera or the like. If the workflow management unit 505 recognizes that all the processes belonging to the category are in the normal end state, the UI image generation unit 506 can change the states of the status bars of the category so as to represent the normal end states. Note that the status bar display is not limited to the one described above. The progress status can be distinguishably displayed in accordance with an arbitrary mode such as at least one of the color and size of the bar (an icon and area indicating the progress status), a pattern, and an animation.

The operator of the information processing apparatus 160 confirms an appropriate process by checking the progress status of the workflow UI. By operating the operation unit 410, the request corresponding to the process can be executed. As an example, different processes are associated with the respective keys of the keyboard of the operation unit 410, and by pressing a key corresponding to a selection target process, the request corresponding to this process can be executed. Note that the execution of this request is not limited to the key input of the keyboard. For example, the display portion of each process of a workflow UI is set as a button, and the user presses this button with the mouse operation, thereby executing the request of this process. Alternatively, the information processing apparatus 160 may have an audio recognition function, and this request may be executed by an audio input using a voice of the operator. In addition to this, an arbitrary method capable of accepting a request execution instruction may be used.

Note that the process progress status can be arbitrarily changed by the user input. For example, although the above description has been made for the workflow in which the information processing apparatus 160 executes the exposure adjustment, the exposure adjustment may be directly set in the camera 301. In this case, the settings from the information processing apparatus 160 need not be performed. At this time, by transitioning the progress statuses of the exposure adjustment processes to the normal end states by the user inputs, the exposure adjustment processing can be skipped.

As described above, in the above processing, the information processing apparatus 160 displays the order of processes by the workflow UI and displays to easily discriminate the progress display operations, thereby efficiently supporting the installation and operation of the system by the user. The user can easily grasp processing to be executed next and can prevent the operation error and the recognition error of the process to be executed next. For this reason, the user executes the requests corresponding to the processes in accordance with the order of displayed processes, so that the user can execute the complicated procedure from the installation to the image capturing without any confusion and any omission. This makes it possible to properly operate the system.

(Example of Processing Procedure Upon Occurrence of Abnormality)

An example of displaying a UI for easily executing processing required for recovery without any omission when an abnormality occurs during processing from installation to image capturing will be described next.

For this processing, the workflow definition information stored in the data recording unit 501 includes information of the contents exceeding the definitions for the processes which will be influenced by the abnormality in addition to the above information. FIG. 12 shows an example of the workflow definition information of this case. In this embodiment, as in FIG. 6, 14 processes and 5 categories are shown. In addition to the information shown in FIG. 6, abnormality information for defining a process to be executed again upon occurrence of an abnormality is included. First, details of each abnormality information will be described below.

A camera disconnection, a lens disconnection, and a universal head disconnection indicate that connections between the respective apparatuses and the image processing apparatus 304 in each image capturing apparatus 101-x are disconnected. These abnormalities are generally referred to as the "disconnection abnormality". The disconnection abnormality influences a process of the apparatus connection category, but does not influence other processes. The disconnection abnormality is defined for only each process in the apparatus connection category. A synchronization abnormality indicates that the synchronization signal output from the image processing apparatus 304 in the image capturing apparatus 101-x does not reach the camera 301 or the information of the synchronization signal is wrong. The synchronization abnormality influences the synchronization process, but does not influence other processes. The synchronization abnormality is defined only for the synchronization category.

A camera movement, a zoom lens movement, a focus lens movement, and a body vibration are generally viewing angle deviation abnormalities. In order to generate a virtual viewpoint image, the plurality of image capturing apparatuses 101-x must perform image capturing of the same space. For this purpose, the positions, camera directions, and focal lengths of the plurality of image capturing apparatuses 101-x must be decided by calculations in advance. That is, viewing angle adjustment indicates that each image capturing apparatus 101-x is set in an installation state obtained in advance. If the installation state is deviated from the state set once, this state is detected as an abnormality. The camera movement indicates, for example, a case in which the posture of the camera 301 is adjusted manually, and a case in which the camera 301 is moved by an external force such as the collision of an object such as a ball against the camera 301 or the universal head 303. The zoom lens movement indicates that the focal length is changed to change the image capturing range by moving the zoom lens. The focus lens movement indicates that the defocus state is set by movement of the focus lens. The body vibration indicates that the camera 301 is slightly moved by the mounting error of the installation jig of the universal head 303 or the mounting error of the installation jig between the universal head 303 and the camera 301. These viewing angle deviation abnormalities influence the respective processes of the viewing angle category and the calibration category, and are defined for these two categories.

An ISO value variation, an iris value variation, a shutter value variation, an ND filter value variation, and an external light change are generally exposure abnormalities. Since the virtual viewpoint image is created by compositing the plurality of captured images, if the cameras 301 having different exposure states are present, the quality of the virtual viewpoint image degrades. The ISO value variation, the iris value variation, the shutter value variation, and the ND filter variation indicate a state in which the setting values of at least some cameras 301 are different from those of other cameras 301. The external light change indicates that the brightness of the surrounding environment changes due to sunlight changes by the opening/closing of the roof of a venue and movement of clouds. The exposure abnormality other than the iris value variation influences only the exposure adjustment process and is defined for only the exposure adjustment process. On the other hand, since the iris value variation influences the depth of field, the calibration process is influenced, thereby defining the iris value variation for these two categories.

The definition contents of the abnormality information are also applied to abnormality detection processing of the abnormality detection unit 508. That is, the abnormality detection unit 508 monitors the connection state between each apparatus and the image processing apparatus 304 in the image capturing apparatus 101-x. If a disconnection is detected, the abnormality detection unit 508 outputs a disconnection abnormality notification to the workflow management unit 505. In addition, the abnormality detection unit 508 monitors the state of the synchronization signal output from the image processing apparatus 304 to the camera 301 in the image capturing apparatus 101-x. If the abnormal state of the synchronization signal is detected, the abnormality detection unit 508 outputs the synchronization abnormality notification to the workflow management unit 505. In addition, the abnormality detection unit 508 obtains the value of the gyro sensor mounted in the camera 301 of the image capturing apparatus 101-x and monitors a posture change of the camera 301. If the abnormality detection unit 508 detects the posture change, it outputs a camera movement abnormality notification to the workflow management unit 505. In addition, the abnormality detection unit 508 obtains the exposure setting value of the camera 301 of the image capturing apparatus 101-x. If a change in, for example, the ISO value is detected, the abnormality detection unit 508 outputs an ISO value variation abnormality notification to the workflow management unit 505. Note that an abnormality detection method different from the method described above may be used as far as an abnormality can be specified. In addition, the abnormality information definition can be arbitrarily set and is not limited to the above example.

For example, if a process which is influenced by an abnormality is defined, as described above, and an abnormality occurs, a process defined according to this abnormality is executed again. This makes it possible to recover to a normal state from the abnormal state. For this reason, if the abnormality is detected, the information processing apparatus 160 notifies the user of the processing of the category and process corresponding to this abnormality. The information processing apparatus 160 generates a UI for prompting the user to execute processing concerning this process and executes processing for displaying the UI.

Figure 13:
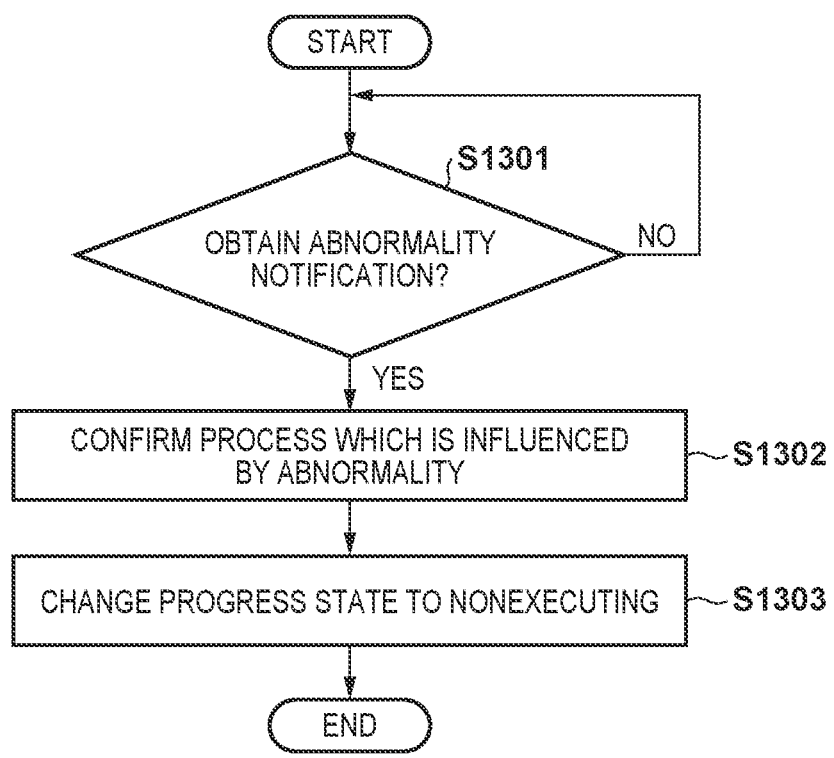
FIG. 13 is a flowchart showing an example of the processing procedure when obtaining an abnormality generation notification.

FIG. 13 shows an example of processing procedure for executing when the workflow management unit 505 obtains an abnormality generation notification. The workflow management unit 505 monitors whether the abnormality notification is received from the abnormality detection unit 508, for example, in parallel to the processing of FIG. 8 or providing the service by the system (S1301). If the workflow management unit 505 obtains the abnormality notification (YES in S1301), it confirms the abnormality information described in the workflow definition information and confirms a process which is influenced by the obtained abnormality (S1302). After that, the workflow management unit 505 changes the progress state to "non-executing" for the process which is influenced by the obtained abnormality (S1303). Note that the updated workflow management information is transmitted to the UI image generation unit 506. The UI image generation unit 506 generates a UI image based on the workflow management information obtained from the workflow management unit 505. The display unit 507 obtains this UI image and displays it on the display device 420. Note that the example in which the abnormality notification is obtained from the abnormality detection unit 508 has been described, but the workflow management unit 505 may detect the abnormality in accordance with the control contents obtained from the control unit 503.

Figure 14A:
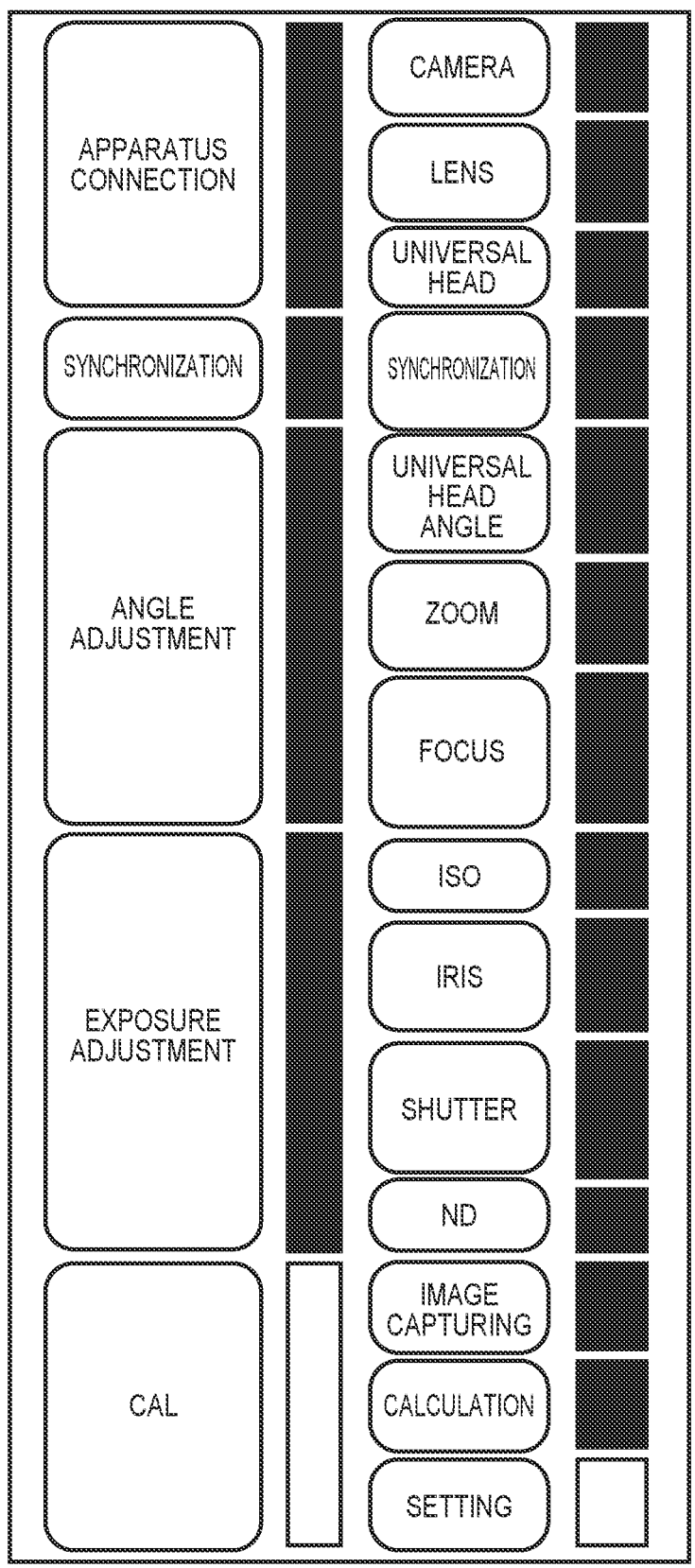
FIG. 14A is a view showing an example of the workflow UI.
Figure 14B:
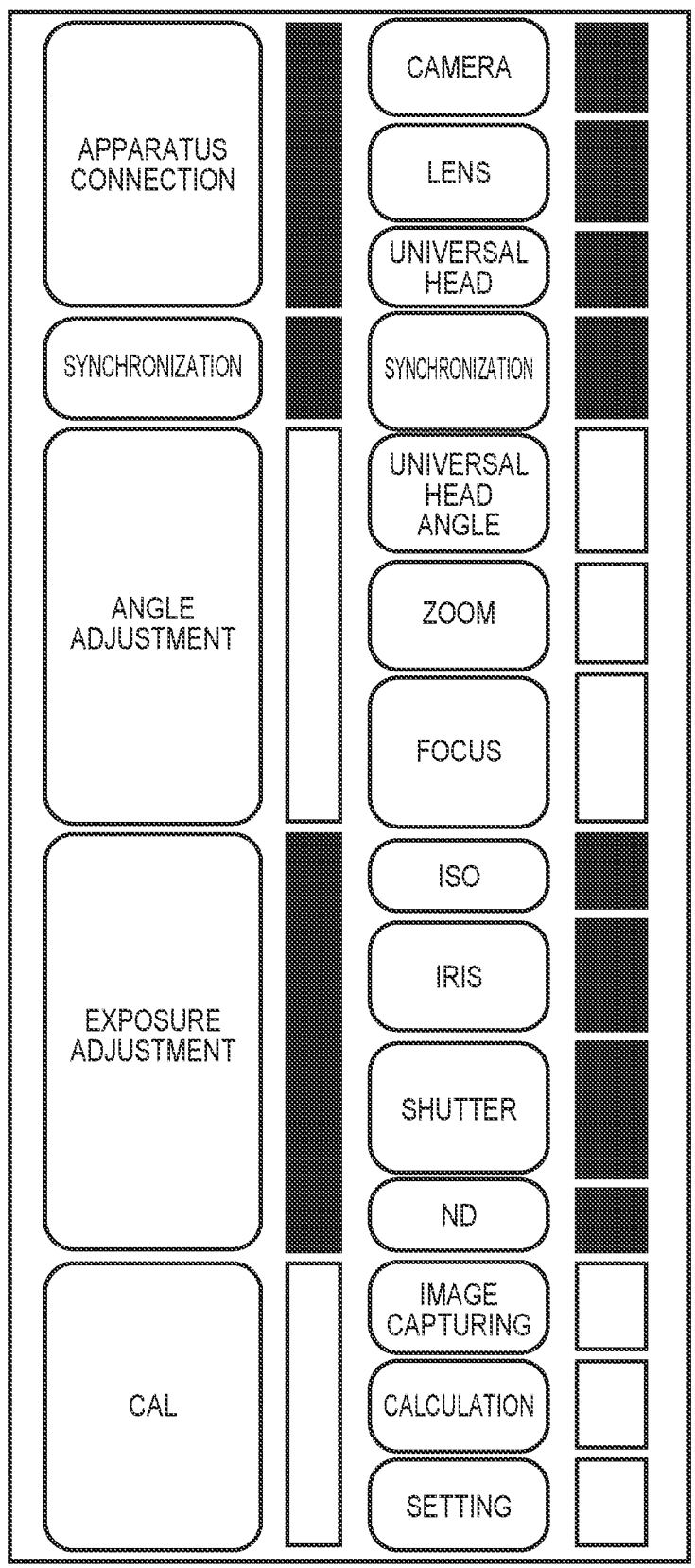
FIG. 14B is a view showing an example of the workflow UI.

FIGS. 14A and 14B show an example of workflow UI display upon occurrence of an abnormality. The operation until the calculation process in the calibration category normally ends by the screen in FIG. 14A. By executing the setting process, a state in which all the processing is complete is displayed. Under this status, assume that the camera movement abnormality occurs due to a factor such as the collision of the operator against the camera. In this case, processes which are influenced by the camera movement abnormality are processes belonging to the viewing angle adjustment category and the calibration category. For this reason, the workflow management unit 505 changes the progress state of the processes which are influenced by the abnormality to "non-completion", thereby updating the UI display. FIG. 14B shows an example of the updated UI display. Accordingly, the operator of the information processing apparatus 160 can recognize that the processes of the viewing angle adjustment category and the calibration category which have been completed become "non-completion". The operator of the information processing apparatus 160 executes again the request corresponding to the incomplete processes, thereby easily executing processing necessary for the recovery from the abnormal state without any omission.

FIG. 14B shows an example in which the "completion" display of the progress status of the exposure adjustment category is maintained because the exposure adjustment category is not influenced by the camera movement. The present disclosure is not limited to this. That is, one or more processes in each of the plurality of categories are sequentially complete to complete processing such as a system setting or the like, the progress status of the exposure adjustment category may be displayed as "non-completion".

A case in which the previous process is complete may be included as a condition in which one category includes a plurality of processes, the process order is determined, and the next process is to be executed. In this case, assume that a given process (process A) is in a "complete" state in one category. If the previous process (process C) needs to be executed again due to an influence such as a camera movement during the execution of the next process (process B), the progress statuses of processes A and C are changed to "non-completion". The display corresponding to these statuses is performed.

In addition, the plurality of processes may be automatically performed by all the apparatuses or may be manually performed. Alternatively, some of the plurality of processes may be manually performed. On the screen displayed on the display device, the progress status may be automatically changed, or the progress status may be changed manually by clicking the process or category with the mouse.

Note that in this embodiment, processing necessary for recovery from the abnormality which has occurred is defined in the workflow definition information in advance, and if an abnormality occurs, the state of the processing corresponding to this abnormality is changed to the incomplete state. However, the present disclosure is not limited to this. For example, processing necessary for recovery from the abnormality may be selected using AI (Artificial Intelligence) machine learning. By using AI, the accuracy of the recovery processing can be improved, and the robust performance of the system can be gradually improved as the number of times of learning increases. In addition, a method different from these methods may be used if it can specify processing necessary for recovery.

The above processing is effective in a system having a large number of apparatuses. An information processing apparatus configured to communicate with this large number of apparatuses can display, using an UI, the information of the workflow concerning a work for operating this system in the above-described way. The information processing apparatus communicates with an apparatus involved in each process of the workflow among a large number of apparatuses, confirms whether this apparatus is set in a state in which the function of the system can be achieved, and displays this state in the UI display. Accordingly, the order of works in the system having a large number of apparatuses can be easily grasped, and the installation and operation can be performed without any error.

Second Embodiment (System Arrangement)

In this embodiment, information concerning the installation (preparation for setting a state in which a system can perform a predetermined function) and removal of the above multi-camera system can be visually collected and notified, thereby appropriately setting the progress of a work. This makes it possible to suppress, on the visual display, occurrence of a human error such as misheard as compared with the status confirmation using only audio communication. Note that at this time, the audio communication can be combined with visual information presentation to smoothly perform confirmation or the like. In addition, since the system automatically collects and presents information, a mistake by the manual confirmation does not occur, and the user can appropriately recognize the status of the work. At this time, the system automatically determines a preferential task and distributes resources such as staff members. Accordingly, an appropriate work schedule can be set without depending on the individual skill of the user. In this case, the system selects and presents an apparatus whose installation is preferentially performed to achieve the original function of the system such as a case in which the virtual viewpoint content is provided or the like. Even if the original work schedule cannot be achieved, the minimum necessary operation of the system can be performed. Note that although the multi-camera system can be used to generate the virtual viewpoint image, the multi-camera system may be a system used in an application except the generation of the virtual viewpoint image. In this embodiment, the "image" here includes a still image and a moving image (video).

Note that the multi-camera system is exemplified in this embodiment, but this embodiment is not limited to this. The following argument can be applied to an arbitrary system required to perform processing such as preparation (various kinds of processing including apparatus installation in order to set a state in which the system can achieve a predetermined function) of a large number of components, removal of the components, and the like.

Figure 15:
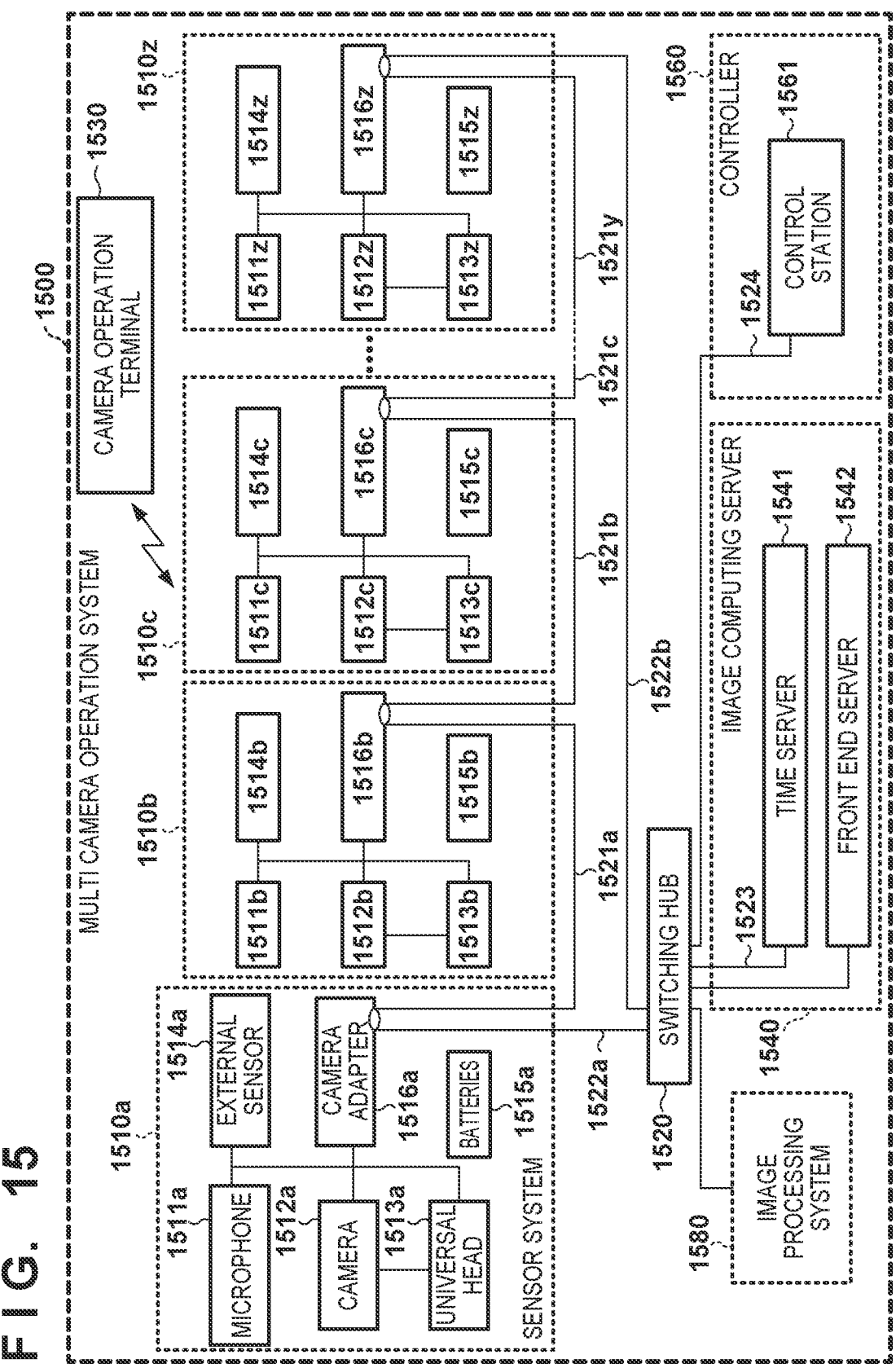
FIG. 15 is a block diagram showing the arrangement example of a multi-camera system.

FIG. 15 shows the arrangement example of a multi-camera system 1500 according to this embodiment. As an example, the multi-camera system 1500 is configured to include sensor systems 1510a to 1510z, a switching hub 1520, a camera operation terminal 1530, an image computing server 1540, a controller 1560, and an image processing system 1580. Note that an example of 26 sensor systems 1510*a* to 1510*z* will be described in FIG. 15, but sensor systems whose number is larger than 26 or smaller than 26 may be used.

The controller 1560 includes a control station 1561. The control station 1561 performs operation state management, parameter setting control, and the like of the blocks constituting the multi-camera system 1500 via daisy chains 1521*a* to 1521*y*, and networks 1522*a*, 1522*b*, 1523, and 1524.

The arrangement and operation of the sensor systems 1510*a* to 1510*z* will be described below. The sensor systems 1510*a* to 1510*z*, respectively, comprise microphones 1511*a* to 1511*z*, cameras 1512*a* to 1512*z*, universal heads 1513*a* to 1513*z*, external sensors 1514*a* to 1514*z*, and batteries 1515*a* to 1515*z*. In addition, the sensor systems 1510*a* to 1510*z* include camera adapters 1516*a* to 1516*z*, respectively, and are connected to each other by the daisy chain 1521*a* to 1521*y* via the camera adapters 1516*a* to 1516*z*. This arrangement is merely an example. The sensor systems 1510*a* to 1510*z* may have another arrangement. In addition, although the sensor systems 1510*a* to 1510*z* have the same arrangement in FIG. 15, some sensor system may have an arrangement different from the remaining sensor systems.

In this embodiment, the sensor systems 1510*a* to 1510*z* are simply referred to as "sensor systems 1510" without distinction between them, unless otherwise specified. The components of the sensor systems 1510 are referred to as the microphones 1511, the cameras 1512, the universal heads 1513, the external sensors 1514, the batteries 1515, and the camera adapters 1516 if these components need not be distinguished from each other. The sensor systems 1510 obtain image data by performing image capturing by the cameras 1512 and obtain audio data by performing recording using the microphones 1511. The multi-camera system 1500 can obtain image data obtained by image capturing from a plurality of directions by using the plurality of sensor systems 1510 configured to capture the images of the same object from different directions. Similarly, the multi-camera system 1500 obtains audio data obtained by recording at a plurality of positions by collecting the sounds at different positions (different directivity characteristics as needed) using the plurality of sensor systems 1510.

The optical axes of the plurality of cameras 1512 are fixed, and the movement of the image capturing range in the right and left direction and the vertical direction by pan, tilt, and the like is not performed. Note that the adjustment of the optical axes, the correction of the shifts and the optical axes by the environment in the initial setting of the cameras 1512 can be performed by the universal heads 1513 on which the cameras 1512 are installed. A given sensor system of the plurality of sensor systems 1510 transmits the image data obtained by image capturing to a sensor system downstream of the given sensor system by a corresponding one of the daisy chains 1521*a* to 1521*y*. At this time, the given sensor system of the sensor systems 1510 transfers the image data obtained from a sensor system upstream of the given sensor system to a sensor system downstream of the given sensor system. For example, in the sensor system 1510*a*, the image data obtained by image capturing using the camera 1512*a* undergoes image processing (to be described later) in the camera adapter 1516*a*, and the sensor system 1510*a* transfers the processed image data to the camera adapter 1516*b* of the sensor system 1510*b* via the daisy chain 1521*a*. Similarly, the sensor system 1510*b* transfers, to the sensor system 1510*c*, the image data obtained by image capturing using the camera 1512*b* together with the image data obtained from the sensor system 1510*a* (or in some cases, using another signal). Note that the sensor system 1510*z* transfers the image data obtained by image capturing and the image data obtained from the upstream sensor system to the switching hub 1520 via the network 1522*b*. By using the daisy chains, even if the image data becomes a large-capacity data along with high-resolution processing of the captured image to a 4K or 8K image and high-frame rate processing, an increase in the number of connection cables and complexity of the wiring work can be prevented.

Handling of the plurality of microphones 1511 and the audio data collected by the microphones 1511 are performed in a similar manner. That is, the directivity directions of the plurality of microphones 1511 are fixed, and the movement of the directions is not performed. In addition, the audio data obtained by collection is transferred to each daisy chain. With this operation, image data and audio data obtained by the sensor systems 1510*a* to 1510*z* are transmitted to the switching hub 1520 from the sensor system 1510*z* using the network 1522*b*. After that, these data are transferred to the image computing server 1540.

Each external sensor 1514 obtains various kinds of environment information by a method other than image capturing and sound collection. For example, each external sensor 1514 can obtain various kinds of information such as the vibration and inclination of each sensor system 1510, the temperature, the humidity, the wind direction, the wind speed, and the like. These kinds of information are merely examples. Each external sensor 1514 can have an arbitrary apparatus arrangement for obtaining an arbitrary environment parameter.

The batteries 1515 are used to execute the workflow when the sensor systems 1510 are installed or removed in the facility such as the sports ground to be described later. For example, the batteries 1515 are used when a system power supply is not installed in the sports ground. Note that the sensor systems 1510 can disable the batteries 1515 after the installation of the sensor systems 1510 is complete and the system power supply is installed. In addition, if the system power supply is installed in advance, the sensor systems 1510 can be configured to operate using the system power supply without using the batteries 1515. Note that a power supply usually installed in the facility may be used in place of the system power supply.

Note that FIG. 15 shows an example in which each camera 1512 and the corresponding camera adapter 1516 are separated from each other. These components may be one apparatus included in a single housing. In addition, each microphone 1511 may be a microphone incorporated in the corresponding camera 1512, or a separate apparatus as shown in FIG. 15 may be prepared. In this manner, the plurality of functional units shown in FIG. 15 may be implemented by one apparatus. Alternatively, one functional unit may be implemented by cooperating a plurality of apparatuses.

In this embodiment, the term "image" includes the concepts of a moving image and a still image, unless otherwise specified. That is, the multi-camera system 1500 can cope with both the still image and the moving image. This embodiment will explain a case in which the virtual viewpoint image and the virtual audible acoustic data are provided by the multi-camera system 1500 as the virtual viewpoint contents. However, this embodiment is not limited to this. For example, the virtual viewpoint content need not include the acoustic data. For example, the audio included in the virtual viewpoint content may be provided in a form other than the virtual audible acoustic data such as the audio recorded by a microphone located nearest to the virtual viewpoint. In addition, according to this embodiment, for descriptive simplicity, the explanation of the audio is partially omitted, but the image and audio are processed at the same time.

Next, the arrangement and operation of the image computing server 1540 will be described below. The image computing server 1540 performs processing of data obtained from the sensor system 1510z. The image computing server 1540 includes a time server 1541 and a front end server 1542.

The time server 1541 has a function of distributing time and a synchronization signal and distributes the time and the synchronization signal to the sensor systems 1510a to 1510z via the switching hub 1520. When the sensor systems 1510a to 1510z receive the time and synchronization signal via the camera adapters 1516a to 1516z, the sensor systems 1510a to 1510z allow synchronization of the cameras 1512a to 1512z based on the time and the synchronization signal, and establish the image frame synchronization. That is, the time server 1541 synchronizes the image capturing timings of the plurality of cameras 1512.

The front end server 1542 reconstructs segmented transmission packets from the image and audio obtained from the sensor system 1510z and performs data format conversion. After that, the data is written in a database (not shown) in the front end server 1542 in accordance with the camera identifier, the data type representing an image or audio, and the frame number.

Note that in the front end server 1542, the data obtained from the camera adapters 1516 is primarily stored in the DRAM and buffered until the foreground image, the background image, the audio data, and the three-dimensional shape data are obtained. Note that in the following description, the foreground image, the background image, the audio data, and the three-dimensional shape data are referred altogether to as image capturing data. Meta information such as routing information, time code information (time information), camera identifier, and the like are added to the image capturing data. The front end server 1542 confirms the data attribute based on this meta information. Accordingly, the front end server 1542 can confirm the buffered data at given time to determine whether the image capturing data is obtained. By this determination, when transferring the data from the camera adapters 1516 via a network 1522, even if the reception order of the network packets does not correspond to the data order, a file can be reliably generated upon waiting obtainment of the necessary data. Note that the background image may be captured at a frame rate different from that of the foreground image. For example, if the frame rate of the background image is 1 fps (frames per second), one background image is obtained per second. To the contrary, if the foreground image is obtained at, for example, 60 fps, there exist timings at which the foreground image can be obtained, but the background image cannot be obtained. For this reason, at such a timing, the front end server 1542 determines that all the data are obtained in a state in which there is no background image.

Figure 25:
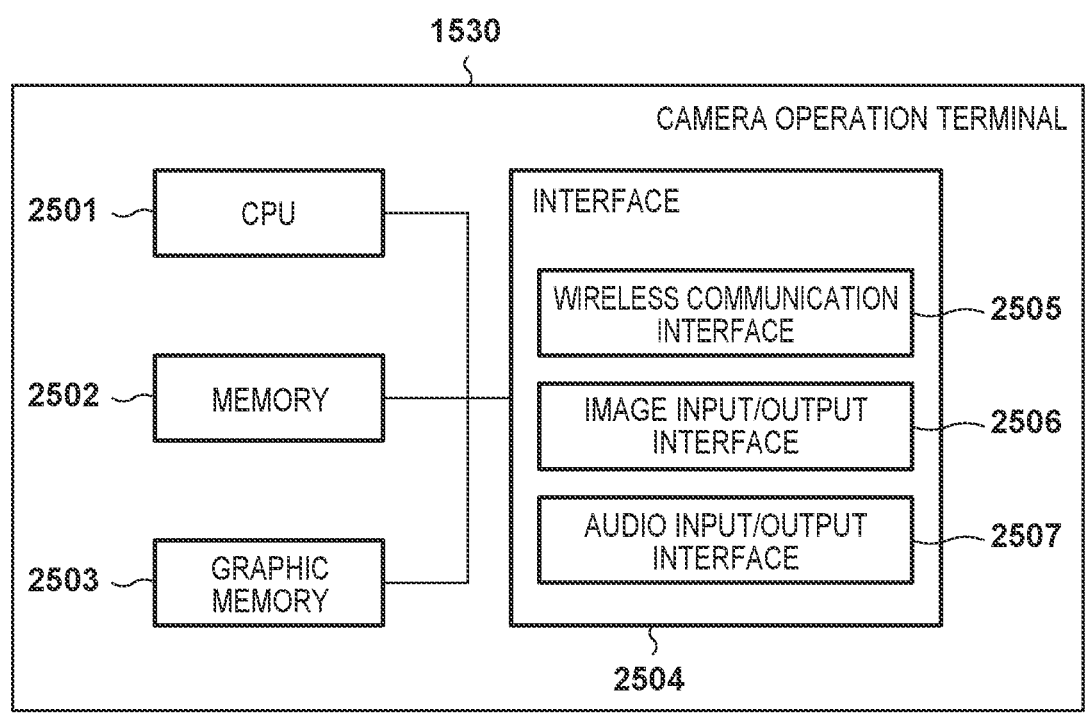
FIG. 25 is a block diagram showing the hardware arrangement example of the camera operation terminal.

As shown in FIG. 25, the camera operation terminal 1530 is a processing apparatus including, for example, a CPU 2501, a memory (RAM and ROM) 2502, a graphic memory 2503, and an interface 2504. The camera operation terminal 1530 can be, for example, a general-purpose personal computer (PC) or the like. In this case, the interface 2504 can include, for example, a wireless communication interface 2505, an image input/output interface 2506, and an audio input/output interface 2507. Note that this arrangement is merely an example. For example, the camera operation terminal 1530 can display a predetermined screen on an external display device such as an HMD (Head Mounted Display) via the image input/output interface 2506, but may include an incorporated display device. The camera operation terminal 1530 may include, for example, a camera as the image input/output interface 2506, capture the image of the state of a work with the camera, and receive the captured image in the camera operation terminal 1530. The camera operation terminal 1530 may be shared with another camera operation terminal 1530 as needed. A function of communicating with an external scanner to receive information such as a drawing may be used, or the camera operation terminal 1530 may include the scanner function as the image input/output interface 2506. Similarly, the camera operation terminal 1530 may output a predetermined audio to an external loudspeaker via the audio input/output interface 2507, but may incorporate such a loudspeaker. In addition, the camera operation terminal 1530 may include a microphone as the audio input/output interface 2507 and receive the audio data. The camera operation terminal 1530 may be shared with another camera operation terminal 1530 as needed. The camera operation terminal 1530 may include an arrangement different from that in FIG. 25, such as an arrangement in which a program is loaded from the storage device such as the memory of the processor except the CPU 2501 and processing is executed, an arrangement dedicated hardware executes processing to be described later, and the like.

The camera operation terminal 1530 can be configured to communicate with each sensor system 1510 via, for example, the wireless communication interface 2505. For example, when the CPU 2501 executes the program stored in the memory 2502, the camera operation terminal 1530 can operate an operation system application. The operation system application is used to operate the multi-camera system and is used, for example, to manage the operation from the even image capturing plan to the installation and image capturing of the system and the removal of the system. In addition, the camera operation terminal 1530 can be configured to execute screen display of the operation system application necessary for operating the system and communication with another camera operation terminal using a text message, an audio, and the like.

Figure 16:
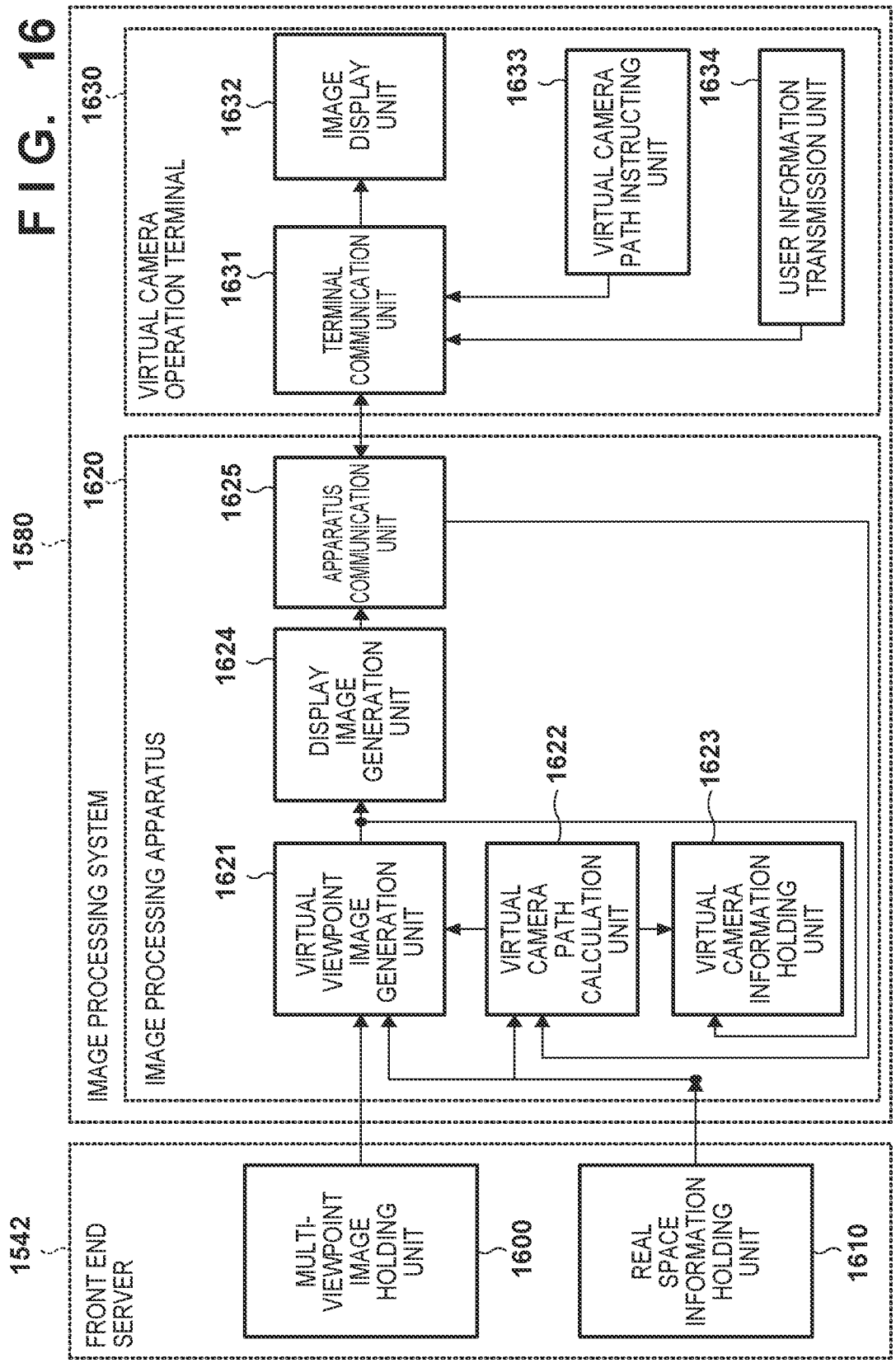
FIG. 16 is a block diagram showing the functional arrangement example of an image processing system.

The image processing system 1580 performs image processing on the image data obtained by image capturing and executes processing up to the screen display. The functional arrangement of the image processing system 1580 will be described with reference to FIG. 16. Note that since the image processing system 1580 cooperates with the front end server 1542, part of the function arrangement of the front end server 1542 is illustrated in FIG. 16. The front end server 1542 includes, as its functions, a multi-viewpoint image holding unit 1600 and a real space information holding unit 1610. The multi-viewpoint image holding unit 1600 holds image data concerning images synchronously captured by the plurality of cameras installed to surround the competition field or studio as described above. In addition, the real space information holding unit 1610 holds information concerning the space of the predetermined range including the object. The real space information holding unit 1610 holds, for example, three-dimensional shape data of an object (background object) captured in the background in the virtual viewpoint image of, for example, the field and audience seats of the sports ground or the facility of the studio, three-dimensional space information indicating the range in which the virtual viewpoint can be set, and the like.

The image processing system 1580 can be configured to include an image processing apparatus 1620 and a virtual camera operation terminal 230. The image processing apparatus 1620 includes, for example, a virtual viewpoint image generation unit 1621, a virtual camera path calculation unit 1622, a virtual camera information holding unit 1623, a display image generation unit 1624, and an apparatus communication unit 1625. In addition, the virtual camera operation terminal 230 includes, for example, a terminal communication unit 1631, an image display unit 1632, a virtual camera path instructing unit 1633, and a user information transmission unit 1634.

The virtual viewpoint image generation unit 1621 generates the three-dimensional shape data of a foreground object using a multi-viewpoint image obtained from the multi-viewpoint image holding unit 1600. A texture matching the virtual viewpoint obtained from the virtual camera path calculation unit 1622 is mapped on the generated foreground three-dimensional shape data and the background three-dimensional shape data obtained from the real space information holding unit 1610, and rendering is performed, thereby generating the virtual viewpoint image. In the process of generating a virtual viewpoint image, the virtual viewpoint image generation unit 1621 calculates the coordinates of the foreground and background objects captured in this virtual viewpoint image to be generated, and texture mapping and rendering of the coordinates are executed. The virtual viewpoint image generation unit 1621 outputs the calculated coordinate values as the object foreground coordinates and real space background coordinates to the virtual camera information holding unit 1623 to be described later.

Based on the instruction contents from the user to the virtual camera path instructing unit 1633 to be described later, the virtual camera path calculation unit 1622 calculates virtual camera path parameters which are continuous as a function of time. The virtual camera path parameters are parameters indicating the movement of the virtual camera when the user observes the object. The parameters include at least the position and direction (gazing direction) and the viewing angle (focal length) of the virtual camera. Note that the virtual camera path parameters are associated with the frame number or time code added to the multi-viewpoint image so as to specify a specific moment in an image capturing scene. When calculating the virtual camera path parameters, the virtual camera path calculation unit 1622 refers to the real space information obtained from the real space information holding unit 1610 and sets a virtual camera path in the range in which the virtual viewpoint can be set.

The virtual camera information holding unit 1623 accumulates the object foreground coordinates and real space background coordinates obtains from the virtual viewpoint image generation unit 1621 and the virtual camera path parameters calculated by the virtual camera path calculation unit 1622.

The display image generation unit 1624 generates a display image to be displayed on the image display unit 1632 of the virtual camera operation terminal 230. A display image to be generated is a virtual viewpoint image generated by the virtual viewpoint image generation unit 1621. The apparatus communication unit 1625 is a functional unit for performing wired or wireless communication via a network (not shown) between the image processing apparatus 1620 and the virtual camera operation terminal 230. Data of an image, an audio, and a text and instruction information such as a virtual camera path instruction sent from the user at the time of generating the virtual viewpoint image are exchanged between the image processing apparatus 1620 and the virtual camera operation terminal 230.

In the virtual camera operation terminal 230, the terminal communication unit 1631 exchanges various kinds of information with the apparatus communication unit 1625 as described above. The image display unit 1632 displays, on a screen, an image generated by the display image generation unit 1624 described above and received via the terminal communication unit 1631. The virtual camera path instructing unit 1633 accepts an instruction for the virtual camera path from the user and transmits the information indicating this instruction to the image processing apparatus 1620 using the terminal communication unit 1631. Note that the image processing apparatus 1620 receives this information using the apparatus communication unit 1625 and transfers the received information to the virtual camera path calculation unit 1622. Note that the user need not strictly instruct all the virtual camera parameters to the total viewing time. For example, the user can input an instruction based on various viewpoints such as "the user wants to view a virtual viewpoint image in which an attention is paid to a specific object (player or performer)", "the user want to view a predetermined range around a ball", "the user wants to view a part where an event to which the attention is paid more has occurred", and the like. The user information transmission unit 1634 adds user information such as a user ID to information to be transmitted from the terminal communication unit 1631 to the apparatus communication unit 1625.

The virtual viewpoint content in this embodiment is a content including a virtual viewpoint image as an image obtained when an object is captured from a virtual viewpoint. In other words, the virtual viewpoint image is an image corresponding to an appearance at the designated viewpoint. The virtual viewpoint may be designated by the user or may be automatically designated based on an image analysis result. That is, an arbitrary viewpoint image (free viewpoint image) corresponding to the viewpoint arbitrarily designated by the user is included in the virtual viewpoint image. In addition, an image corresponding to the viewpoint designated by the user from a plurality of candidates, and an image corresponding to the viewpoint automatically designated by the apparatus are also included in the virtual viewpoint images.

Figure 17:
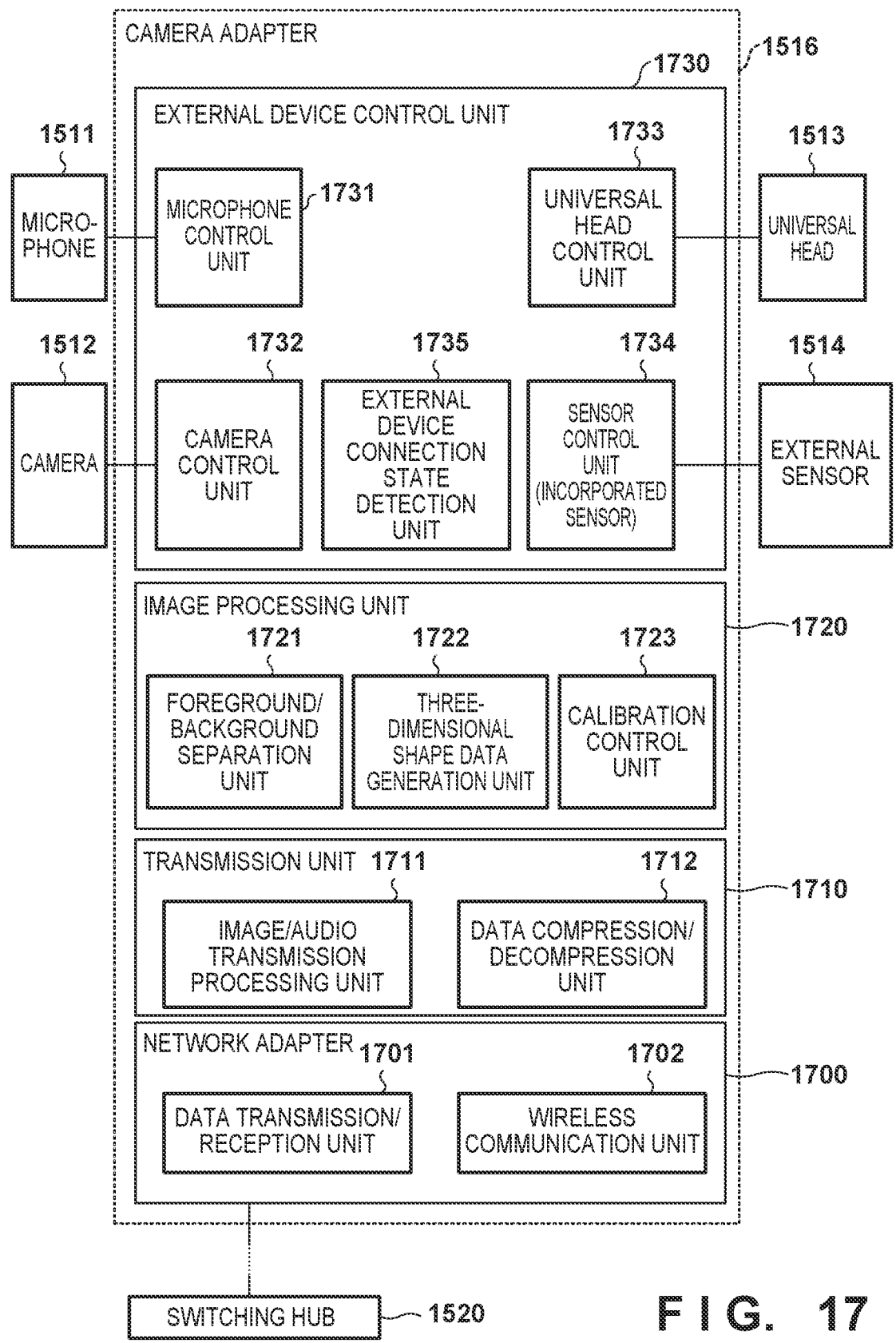
FIG. 17 is a block diagram showing the functional arrangement example of a camera adapter.

The functional arrangement of the camera adapter 1516 will be described with reference to FIG. 17. The camera adapter 1516 includes a network adapter 1700, a transmission unit 1710, an image processing unit 1720, and an external device control unit 1730. The network adapter 1700 includes a data transmission/reception unit 1701 and a wireless communication unit 1702. The transmission unit 1710 includes an image/audio transmission processing unit 1711 and a data compression/decompression unit 1712. The image processing unit 1720 includes a foreground/background separation unit 1721, a three-dimensional shape data generation unit 1722, and a calibration control unit 1723. The external device control unit 1730 includes a microphone control unit 1731, a camera control unit 1732, a universal head control unit 1733, and a sensor control unit 1734. Note that the external device control unit 1730 further includes an external device connection state detection unit 1735.

The network adapter 1700 is configured to include various kinds of functions for performing communication with another apparatus. The data transmission/reception unit 1701 performs data communication with another camera adapters 1516, the front end server 1542, the time server 1541, and the control station 1561 via the daisy chain 1521, the network 1523, and the network 1524. For example, the data transmission/reception unit 1701 outputs, to other camera adapters 1516, the foreground image and the background image obtained by separating the capture image by the camera 1512 by the foreground/background separation unit 1721 to be described later. The output destination camera adapter 1516 is a downstream camera adapter 1516 adjacent to the daisy chain 1521 among the camera adapters 1516 of the multi-camera system 1500. The many camera adapters 1516 output the foreground and background images. The foreground and background images captured from the plurality of viewpoints are transmitted to the front end server 1542, and the virtual viewpoint image is generated by the image processing system 1580. Note that there may exist the camera adapter 1516 which outputs the foreground image separated from the captured image and does not output the background image.

The wireless communication unit 1702 performs communication with the wireless communication interface 2505 of the camera operation terminal 1530. Data communicated via the wireless communication unit 1702 is data to be processed by the external device connection state detection unit 1735 to be described later and is data for executing the operation system application operated in the camera operation terminal 1530.

The transmission unit 1710 has a function of executing signal processing on the data exchanged via the network adapter 1700. The image/audio transmission processing unit 1711 creates a message for transferring the image data or audio data to another camera adapter 1516 or the front end server 1542 via the data transmission/reception unit 1701. The message includes image data or audio data, and meta information of each data. Note that the meta information of this embodiment includes a time code, sequence number, and data type at the time of capturing an image and sampling an audio, an identifier representing the individual component such as the microphone 1511 and the camera 1512, and the like. In addition, the image data or audio data to be transmitted may be data-compressed by the data compression/decompression unit 1712. In addition, the image/audio transmission processing unit 1711 receives a message from another camera adapter 1516 via the data transmission/reception unit 1701. The image/audio transmission processing unit 1711 restores the image data or audio data from data divided into a packet size of a transmission protocol definition in accordance with the data type included in the message. Note that when data is compressed upon restoring the data, the data compression/decompression unit 1712 performs decompression processing. The data compression/decompression unit 1712 performs compression via the data transmission/reception unit 1701 in accordance with compression in which a predetermined compression method, compression rate, and the frame rate are applied to the data exchanged via the data transmission/reception unit 1701, and decompresses the compressed data.

The image processing unit 1720 performs image processing on the image data obtained by image capturing using the camera 1512 under the control of the camera control unit 1732 and the image data received from another camera adapter 1516. The foreground/background separation unit 1721 separates the image data obtained by image capturing using the camera 1512 into the foreground image and the background image. That is, the foreground/background separation unit 1721 of each of the plurality of camera adapters 1516 extracts a predetermined area from the image captured by the corresponding camera 1512 of the plurality of cameras. The predetermined area is an object-detected area by, for example, the object detection processing for the captured image. The foreground/background separation unit 1721 sets, as the foreground image, an image in the predetermined area which is extracted from the captured image and sets, as the background image, an image in an area other than the predetermined area (that is, an image in an area other than the foreground image), and outputs the foreground image and the background image. The three-dimensional shape data generation unit 1722 generates image information concerning the three-dimensional shape data in accordance with, for example, the stereo-camera principle using the foreground image separated by the foreground/background separation unit 1721 and the foreground image received from another camera adapter 1516. The calibration control unit 1723 performs, for the input image, color correction processing for suppressing the color variations for each camera, the image alignment with respect to the blur caused by the vibration of the camera, and the image cropping processing.

The external device control unit 1730 has a function of controlling an apparatus connected to the camera adapter 1516. The camera control unit 1732 is connected to the camera 1512 in the sensor system including the camera adapter 1516. The camera control unit 1732 performs control of the camera 1512, the obtainment of the captured image, the provision of the synchronization signal, time setting, and the like. The control of the camera 1512 includes, for example, setting and reference of the image capturing parameters (the number of pixels, the color depth, the frame rate, the white balance, and the like), obtainment of information representing the state (during image capturing, during stop, during synchronization, an error, and the like) of the camera 1512, the start and stop of image capturing, focus adjustment, and the like. The microphone control unit 1731, the universal head control unit 1733, and the sensor control unit 1734 are respectively connected to the microphone 1511, the universal head 1513, and the external sensor 1514 of each sensor system including the camera adapter 1516 and control the connected apparatuses. The microphone control unit 1731, the universal head control unit 1733, and the sensor control unit 1734 perform processing for reading out, from the corresponding apparatuses, pieces of information indicating the state indicating whether the connected apparatuses are normally operated. The external device connection state detection unit 1735 has a function of reading out a self-check result such as the connection state of the apparatus connected to the camera adapter 1516 and whether each apparatus is operated normally. The external device connection state detection unit 1735 communicates with the microphone control unit 1731, the camera control unit 1732, the universal head control unit 1733, and the sensor control unit 1734 and stores the external apparatus connection state obtained from each apparatus and the self-check result in the memory in the external device connection state detection unit 1735. Note that if the power is not supplied to the external apparatus, the external device connection state detection unit 1735 detects only the connection state of the cable. The connection of the cable can be detected in hardware level by setting one of the cable terminals of the camera adapter 1516 to a high port and setting it to low level when the cable is connected.

(Processing Procedure)

Figure 18:
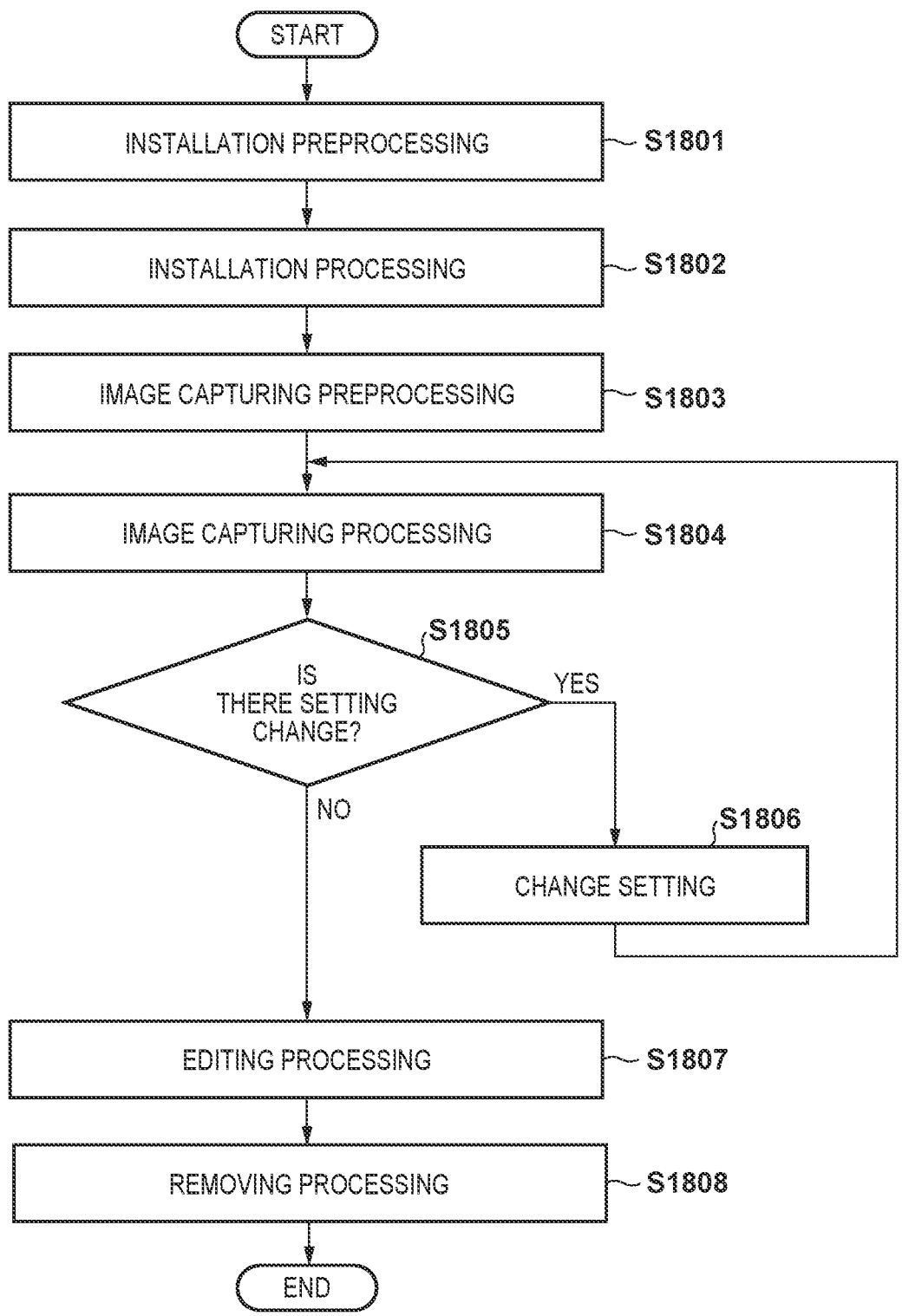
FIG. 18 is a flowchart showing an example of a workflow for operating the system.

A workflow to be executed when the plurality of cameras 1512 and the microphones 1511 are installed in the facility such as the stadium, sports ground, and the concert hall, and image capturing is performed will be described. FIG. 18 schematically shows the overall image of the workflow. Note that the processing to be described below is implemented by control of the camera operation terminal 1530, unless otherwise specified. Note that processing to be executed by the camera operation terminal 1530 is implemented by causing the CPU 2501 of the camera operation terminal 1530 to execute the program stored in the memory 2502.

In this workflow, first of all, before a series of processing, the operator (user) who performs the installation and operation of the multi-camera system 1500 performs installation preprocessing such as the collection of the information (prior information) necessary before the installation, the drafting of the plan, and the like. By this preprocessing, the camera operation terminal 1530 accepts setting depending on a plan drafted by the user such as a case in which how the system installation and removal are performed based on the prior information (S1801).

Note that in this case, the prior information includes, for example, facility information, apparatus information, and operation information. The facility information is, for example, stadium information if the image capturing location is the stadium. The facility information includes information such as the shape, acoustic condition, illumination, power supply, and transmission environment of the stadium and information such as the three-dimensional shape data of the stadium. The apparatus information includes information of, for example, image capturing components such as a camera, universal head, lens, and microphone, information apparatus such as a LAN, PC, server, cable, and the like, and information concerning an outside broadcast van. Note that all these pieces of information need not be input. Note that the camera operation terminal 1530 accepts an input concerning arrangement information of the camera, universal head, and microphone among the image capturing components whose apparatus information is input. The arrangement information can be input using the above three-dimensional shape data of the stadium. The operation information includes information of a camera mounting form (for example, a high-place work), a work type (work stage), a work time, the number of workers, skill levels of workers, and the like. Note that the arrangement information may include information of an image capturing target, image capturing time, a camera work, a gazing point, and the like. For example, a change in gazing point, and a change in restriction condition of the camera work are performed in accordance with a competition type such as a case in which the image capturing target is the soccer competition. The camera operation terminal 1530 manages and changes a setting information table constituted by a combination of these pieces of operation information and uses this table for processing such as various kinds of instructions.

Next, the user installs components in a target facility. Each apparatus of the multi-camera system 1500 executes processing for confirming the operation of the system in accordance with a command issued from the camera operation terminal 1530 based on the user operation (S1802). Note that during the installation of the components, since the system is not perfectly operated, sequential communication is performed between the camera operation terminal 1530 and each camera adapter 1516, thereby managing the operation at the time of installation. This processing will be described later. After the completion of the installation of the components, each installed camera 1512 is adjusted. The adjustment of the camera 1512 includes viewing angle adjustment and color adjustment. This adjustment is performed for all the installed cameras 1512. Note that the adjustment may be performed based on the user operation or implemented by the automatic adjustment function. In addition, in the viewing angle adjustment, the zoom, pan, tilt, and focus are simultaneously adjusted, and the camera operation terminal 1530 obtains the adjustment results and stores them.

The user then executes image capturing preprocessing which can include the confirmation of an audio collected by each microphone 1511 and an image captured by each camera 1512, adjustment corresponding to the confirmation results, and the like (S1803). After that, the camera operation terminal 1530 performs sound collection using each microphone 1511 and image capturing using each camera 1512 (S1804). Note that the image capturing in S1804 includes sound collection using each microphone 1511. However, the present disclosure is not limited to this. Only image capturing may be performed. The processing in S1804 is continuously executed until the setting in S1802 is changed or the image capturing ends. If the setting in S1802 is changed or the image capturing ends, the processing advances to S1805.

If the user operation for changing the setting in S1802 and continuously performing the image capturing is performed (YES in S1805), the camera operation terminal 1530 advances the processing to S1806. If the user operation for completing the image capturing is performed (NO in S1805), the processing advances to S1807. Note that this determination may be performed based on the user operation or based on whether the camera operation terminal 1530 determines whether the setting change is autonomously required.

In S1806, the camera operation terminal 1530 changes the setting performed in S1802 to a new setting. The change contents are determined based on, for example, the user operation obtained in S1805. If the image capturing must be stopped during the change in the setting in S1806, the image capturing is temporarily stopped, and the image capturing is restarted after the setting is changed. If the image capturing need not be stopped, the setting can be changed while the image capturing is continued.

In S1807, the camera operation terminal 1530 issues an instruction for editing the images captured by the plurality of cameras 1512 and audios collected by the plurality of microphones 1511. Note that the processing in S1807 may be executed in parallel to the processing in S1804. For example, when real-time distribution of a sports competition or a concert is to be performed (for example, a competition image is to be distributed during the competition), editing in S1807 is simultaneously executed for the data obtained in the image capturing without waiting for the end of the image capturing in S1804. On the other hand, when highlight images in a sports competition are to be distributed, editing is executed after the end of the image capturing in S1805.

After the image capturing and the editing end, processing of removing the components is performed (S1808). The removal processing restores the state of the facility before the installation by, for example, the detachment work of the components installed in S1802. Note that the above processing is executed in the camera operation terminal 1530, but the controller 1560 may execute the processing in a state in which the normal operation of the system is possible after completion of the installation. That is, the controller 1560 may execute processing from the image capturing preprocessing in S1803.

Figure 19:
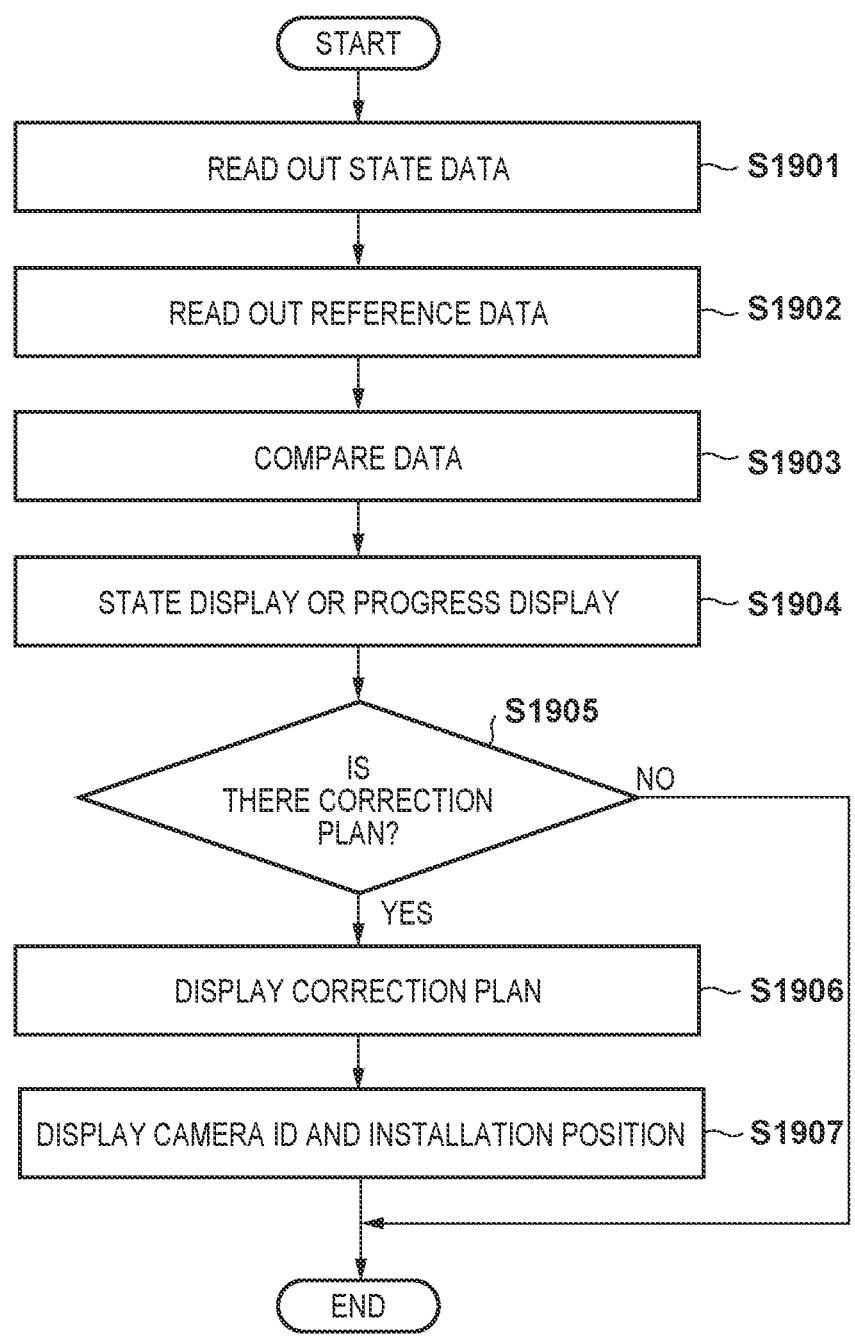
FIG. 19 is a flowchart showing an example of the processing procedure when installing an apparatus.

Subsequently, the processing procedure at the time of component installation will be described with reference to FIG. 19. The processing in FIG. 19 is implemented by causing the CPU 2501 of the camera operation terminal 1530 to execute the program stored in the memory 2502.

First, the camera operation terminal 1530 reads out state data (S1901). The state data is data stored in the external device connection state detection unit 1735 of each camera adapter 1516 and data representing the connection state of a component connected to this camera adapter 1516. Note that the external device connection state detection unit 1735 may obtain information detected by the external device connection state detection unit 1735 in another camera adapter 1516. In this case, the external device connection state detection unit 1735 collects pieces of information of the connection states of the external apparatuses in the plurality of camera adapters 1516 in, for example, a range in which installation of daisy chains is complete. The external device connection state detection unit 1735 collectively notifies the camera operation terminal 1530 of the obtained information. In addition, the external device connection state detection unit 1735 may transmits, for example, the information to the camera operation terminal 1530 via a temporarily installed external access point or local area network (or an access point or local area network installed in advance in the facility in which a system has been constructed). Accordingly, the camera operation terminal 1530 can obtain information from the plurality of external device connection state detection units 1735 via a small number (for example, one) of access points and need not obtain the information by moving near a large number of camera adapters 1516. After that, the camera operation terminal 1530 reads out reference data (S1902). The reference data is, for example, data defined from particularly apparatus information and operation information among the prior information described in S1801 in FIG. 18. The reference information includes, for example, information such as the time and the number of workers required to mount one camera. The camera operation terminal 1530 compares the state data read out in S1901 with the reference data read out in S1902 (S1903). The camera operation terminal 1530 sets the screen display to the state display or progress display (S1904). In the state display, the above state data is displayed. In the progress display, the progress status of a work for the reference data is displayed.

In addition, the camera operation terminal 1530 determines based on the result in S1903 whether there is a correction plan of a work (S1905). If there is the correction plan (YES in S1905), the camera operation terminal 1530 displays the correction plan (S1906). The camera operation terminal 1530 then displays the detailed camera ID and installation position and the like (S1907). Note that there is no correction plan (NO in S1905), the camera operation terminal 1530 ends the processing in FIG. 19 without executing processing in S1906 and S1907.

For example, assume that a work capacity of mounting 12 cameras per hour is available, and a plan is drafted assuming that 60 cameras are mounted within 5 hours. At this time, if the work time of one hour must be shortened upon the elapse of 2 hours from the start of the work, 36 cameras must be mounted within the two remaining hours. However, only 24 cameras can be mounted judging from the work capacity. For this reason, the camera operation terminal 1530 selects, for example, 24 cameras from the 36 uninstalled cameras in a priority order, changes the installation plan, and displays this change in S1906.

FIGS. 20A and 20B show an example of state display in the camera operation terminal 1530. The camera operation terminal 1530 includes an application switch for displaying a state and performs the state display as in FIGS. 20A and 20B. The camera operation terminal 1530 can transmit a request command to each camera adapter 1516 to update the displayed information on the state display screen. Upon receiving the state information request command, the camera adapter 1516 transmits data concerning the connection state or installation state of each cable the self-check result data of each apparatus to the camera operation terminal 1530. Accordingly, the current installation status is displayed in the camera operation terminal 1530.

FIG. 20A shows an example of state display. Horizontal columns display task names concerning the connection/installation states for the respective cameras. Vertical columns display data of the respective cameras. As for the connection state for each camera, for example, the connection state of a cable between the camera 1512 and the camera adapter 1516 is displayed by information of the horizontal status column of a camera ID. In addition, whether the cable for controlling, for example, the lens is connected to the camera adapter 1516 is determined by the information of the horizontal status column of the lens ID. Note that the information of the horizontal status column of the lens ID may indicate, for example, whether the preparation for monitoring whether the lens is appropriately set by the external sensor 1514 has been made. In this case, the information of the horizontal status column of the lens ID may be, for example, information indicating whether the external sensor 1514 for lens monitoring is connected to the camera adapter 1516. In addition, the information indicating the connection state of the cable communicating with another sensor system 1510 and the connection state with any other external apparatus can be managed in a table form as in FIG. 20A. The display concerning the installation state may include not only the cable connection, but also the self-check result of the connected apparatus or the state of attaching the camera 1512 and the camera adapter 1516 to the mounting metal pieces for mounting the camera 1512 and the camera adapter 1516 to a facility. In addition, the state of the cable itself used for connection may be displayed (by the information of the horizontal status column of the cable ID). As an example, if a camera becomes set in an image capturing enable state, all information of the row corresponding to this camera is set to "OK". Note that in at least some sensor systems 1510, the columns indicating the states of external apparatuses which are not used may not be prepared. A symbol "-" indicating such a state may be described. For example, if a system is installed in a stadium, the state display may be performed by a screen for displaying the installation position of a camera or the like in the schematic view of the stadium in a schematically recognizable form in place of the table form shown in FIG. 20A.

FIG. 20B shows an example of progress status display (progress display). In the example of FIG. 20B, display of a list of a scheduled time, a result, a progress rate for each work is performed. In this display, the result in S1903 of FIG. 19 is used. For example, in a task for installing each camera, the scheduled start time, scheduled end time, time at which the task is actually started, and time at which the task actually ends are displayed. The information is described in columns of the work contents to determine whether this task is a task for installing the camera. If all the contents of the task are complete, "100%", "complete", or the like is displayed in the column of the progress rate. Note that during the execution of the task or upon the end of processing while the initial schedule is incomplete, a value smaller than 100% is described in the progress rate column. Note that in this case, for example, a character string such as "end" may be described in addition to the numerical value of the progress rate in order to indicate a fact that the task is not being executed. For example, in a state in which 54 cameras have been installed for a task for installing 60 cameras, "90%" is described in the progress rate column. If the task ends in this state, "90% (end)" or the like can be described.

FIG. 21 is a view for explaining the display example of a correction plan when it is determined in S1905 of FIG. 19 that the correction plan exists. The operation system application for operating the camera operation terminal 1530 reads out the estimated task completion time of the workflow stored in the camera operation terminal 1530 and the connection state data stored in the external device connection state detection unit 1735. If the installation completion count does not satisfy a predetermined threshold with respect to the estimated time in the installation progress status determined by both the data (if it is determined that the scheduled task cannot be complete), the operation system application generates a correction plan.

Note that as shown in FIG. 21, in the screen display, the relative scheduled camera installation positions for the image capturing target ground 2120, and cameras to be installed and uninstalled cameras are displayed in a distinguishable manner. For example, FIG. 21 shows a state in which a total of six cameras 2111a to 2111f surrounded by a broken line 2110 in the range of Area N are not installed. Note that these cameras can correspond to "Cam03" to "Cam05" and "Cam08" to "Cam10" in FIG. 20A. In this state, for example, it is assumed to be determined that the remaining time is a time for installing only two cameras. In this case, for example, selection of two cameras as the installation targets is displayed by a correction plan.

An example of priority order data for setting a priority order will be described for cameras to be installed. The cameras constituting the system includes, for the application purpose, a camera for obtaining an image for generating three-dimensional shape data, a camera for generating a human texture, and a camera for generating a background texture. As an example, the priority order according to the application purposes of these camera is set. For example, a three-dimensional shape data generation camera has the highest priority, the human texture camera has the second highest priority, and the background texture camera has the lowest priority, thus setting the priority order. For example, FIG. 21 shows an example of a correction plan when the cameras 2111c and 2111d are defined as the human texture cameras having the highest priority and it is determined that these cameras should be installed. In the example of FIG. 21, the cameras 2111c and 2111d are encircled to indicate that these cameras are cameras to be installed. On the other hand, as shown in FIG. 21, the cameras 2111a, 2111b, 2111e, and 2111f which have lower priorities and are not selected as the installation targets are marked with ×. This indicates that it is thus determined that these cameras are not installed. This display is shared with the camera operation terminal 1530 of the staff member who executes the installation work. The staff member can visually recognize a camera to be installed. This makes it possible to perform an installation work without any error.

Note that the camera operation terminal 1530 communicates with, for example, a camera 2130 via the wireless communication unit 1702 of each camera adapters 1516, obtains the information representing the installed camera, and displays it. In this system, since the sensor systems 1510 are connected by the daisy chains, each camera operation terminal 1530 can obtain information in any other connected sensor system from the corresponding camera adapter 1516 of any one of the sensor systems 1510. If there are a plurality of users, the plurality of camera operation terminals 1530 may be used, and the data collected or displayed between the plurality of camera operation terminals 1530 are shared. For example, the camera operation terminal 1530 communicating with the camera 2130 can obtain information of a camera 2150 via a camera 2140. Similarly, the camera operation terminal 1530 communicating with the camera 2150 can obtain information of the camera 2130. In addition, each camera operation terminal 1530 can obtain information of the camera 2140 and a camera 2160. Note that data input and determination can be controlled by setting an operation authority to a specific user. Note that information sharing may be performed via an external network (for example, a temporary local area network formed in a facility which constructs a system). This makes it possible to collect the component installation status of the entire system even if the system systems 1510 are disconnected from each other.

Note that the correction plan for designating a camera to be preferentially installed may be determined by a method other than a method based on a camera type (application purpose) when generating a virtual viewpoint image for each camera as described above. Alternatively, for example, the correction plan may be determined by a method such that an uninstalled camera away farther from the installed camera has a higher priority in accordance with the position of the camera which has been installed (that is, a higher priority is given for an area where no camera is installed). Alternatively, the camera to be installed preferentially may be set for each gazing point (A Group or B Group).

Figure 22:
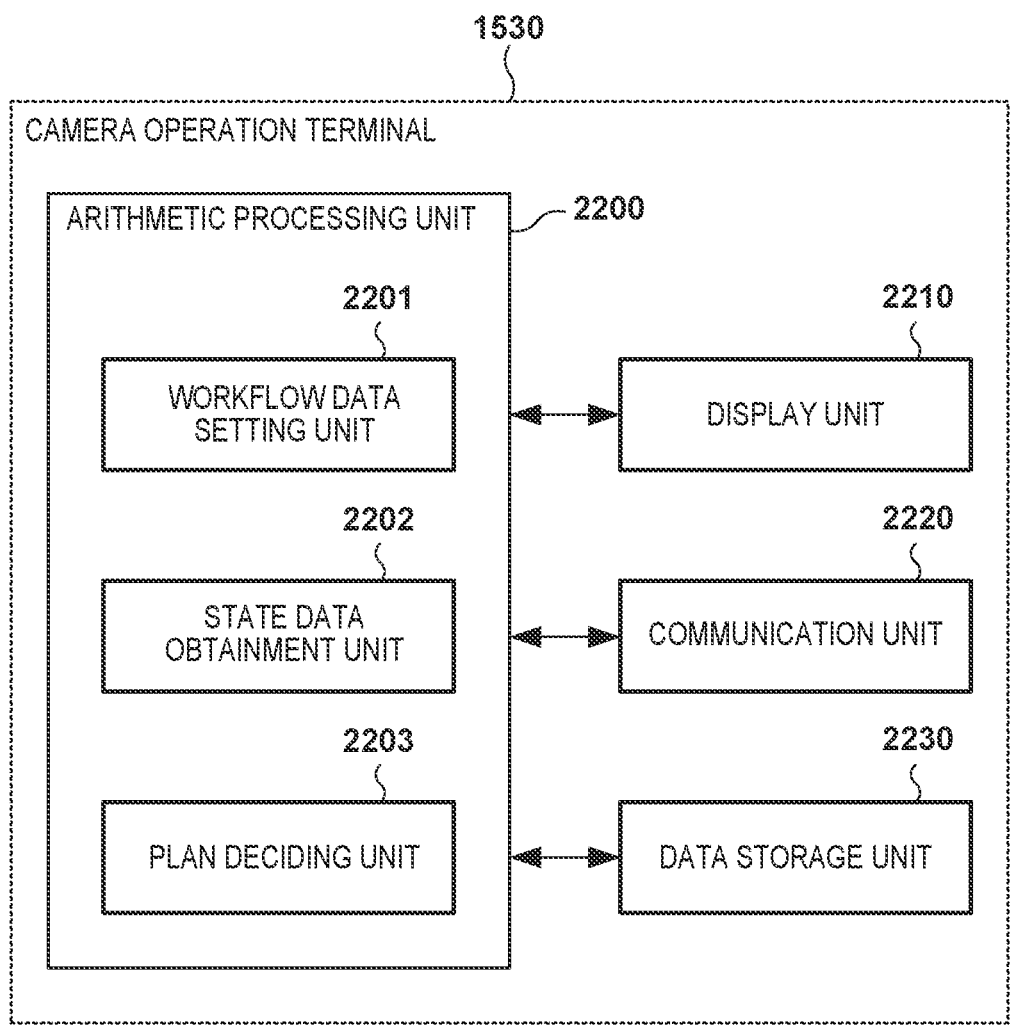
FIG. 22 is a block diagram showing the functional arrangement example of a camera operation terminal.

An example of the functional arrangement of the camera operation terminal 1530 will now be described with reference to FIG. 22. The camera operation terminal 1530 implements the functions shown in FIG. 22, for example, when a CPU 2501 executes the program read out from a memory 2502. The camera operation terminal 1530 is configured to include an arithmetic processing unit 2200, a display unit 2210, a communication unit 2220, and a data storage unit 2230. The display unit 2210 performs processing for displaying information on a screen (not shown) based on the processing result of the arithmetic processing unit 2200. The communication unit 2220 communicates with the corresponding camera adapter 1516 to exchange data such as a connection state. The data storage unit 2230 stores various kinds of data (tables) such as reference data and data indicating a connection state.

The arithmetic processing unit 2200 is configured to include a workflow data setting unit 2201, a state data obtainment unit 2202, and a plan deciding unit 2203 to execute processing of the operation system application. The workflow data setting unit 2201 sets the workflow information until the installation of the multi-camera system in the predetermined area, removal of the multi-camera system from the predetermined area, and confirmation of the image capturing enable state as described above and thus sets the workflow of the installation and removal of the image capturing components in each facility. The set data can be used in the subsequent processing. The reference data is data defined particularly by the apparatus information and operation information among the prior information.

FIGS. 23A and 23B show examples of tables stored as the above reference data in the data storage unit 2230. Referring to FIG. 23A, a step ID is a step identifier assigned in association with one step in the workflow. The step ID is configured to include completion time, flag ID list, and list No. The completion time indicates scheduled time for completing the corresponding step. The flag ID list is associated with an apparatus connection configuration table shown in FIG. 23B. In each step, a readout target of the installation state such as a connection state of a cable of each apparatus and the like is designated. The list No. is information for designating an apparatus serving as the information readout target in the step.

The state data obtainment unit 2202 communicates with the corresponding camera adapter 1516 to obtain state data indicating the apparatus connection state, the installation state, and the like in each workflow. The state data obtainment unit 2202 rewrites the contents of a table stored in the data storage unit 2230 as needed. FIG. 23C shows an example of the table stored in the data storage unit 2230 as the state data. The list No. is a number managed by grouping the apparatus arrangements for each camera. The list No. is associated with an apparatus or connected apparatus identifier such as a camera ID, a lens ID, cable1_ID, and the like. Note that the list No. in FIG. 23A is associated with the list No. of FIG. 23C, and the apparatus read out for each step is designated by this list No. The value of each constituent component is rewritten based on the collection result of the state data obtainment unit 2202.

The plan deciding unit 2203 compares the flag ID list of the above reference data with the constituent component of the state data and performs processing for generating at least one of the progress data and the correction plan. The generated correction plan is stored in the data storage unit 2230. When switching a screen for displaying a correction plan which exists, the correction plan is read out from the data storage unit 2230 and used for generating display information. Note that a plurality of correction plans may be generated, and when displaying a screen, the plurality of correction plans may be displayed to allow the user to select a desired one.

FIG. 23D shows an example of correction plan data to be stored in the data storage unit 2230. As shown in FIG. 23D, as an example, the correction plan data can be stored in a form of a table. The correction plan data is generated to include constituent components similar to, for example, the table constituent components of the reference data shown in FIG. 23A. As an example, in the correction plan data, the list No. (that is, the processing target apparatus in each step) is changed from the reference data in accordance the state data. FIG. 23D shows that the list Nos. in steps having step IDs of 1003 to 1005 from the reference data in FIG. 23A, that is, the arrangements of the cameras to be installed are changed. Note that rewriting of the table by the above correction plan can be appropriately executed based on the state data by the arithmetic processing unit 2200. However, the user may rewrite the table based on the determination of the progress status.

Figure 24:
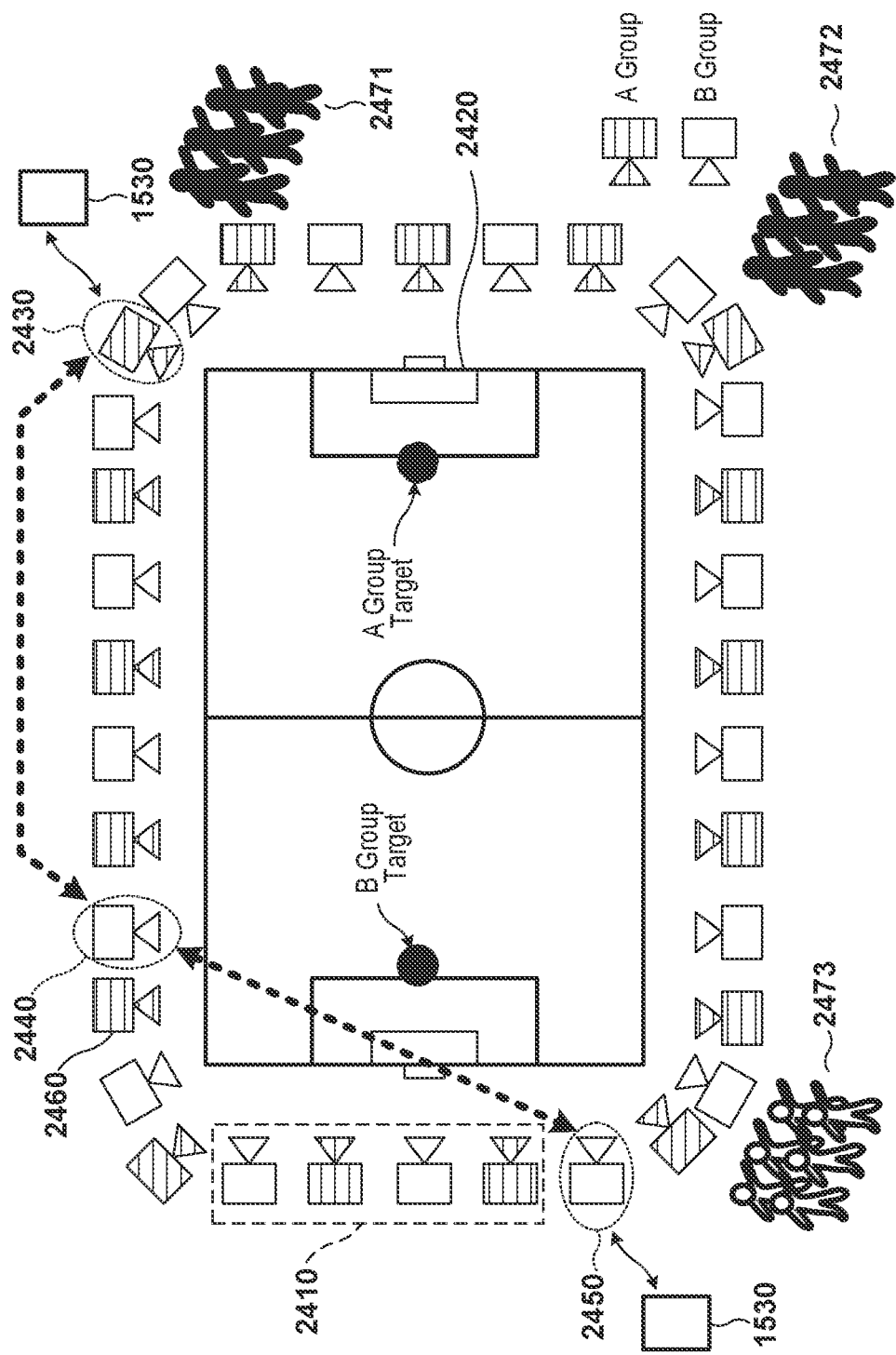
FIG. 24 is a view for explaining another display example of the correction plan.

FIG. 24 is a view for explaining a plan different from the correction plan described with reference to FIG. 21. If the installation completion count does not reach the predetermined threshold with respect to the estimation time, the correction plan is generated in the same manner. However, if the resources of work staff members are rearranged to be concentrated, the correction plan is an example when it is determined that the processing is complete within the scheduled time.

In the example of FIG. 24, each of groups 2471 to 2473 of work staff members includes six staff members. At this time, the work staff members to be rearranged in an uninstalled area can be determined using as parameters the number of cameras, the number of all work staff members, skills of the work staff members, and the like. At this time, since the work staff member location is displayed on the screen, the user can determine the work staff members to be rearranged in the uninstalled area. On the other hand, the camera operation terminal 1530 may display the recommendation information of the work staff members to be rearranged, based on, for example, the above parameters, by flickering icons of the work staff members. Note that in the example of FIG. 24, since the work staff members 2473 exist at a position near an uninstalled area 2410, the work staff members 2473 are displayed in white as the work staff members to be recommended, so that they are discriminated as the staff members which are not targets to be recommended.

Note that the position of each work staff member can be specified based on the measurement result of the GPS terminal of the work staff member (for example, the camera operation terminal 1530 having the GPS function). However, the present disclosure is not limited to this. The position of the staff member may be estimated based on the camera operation terminal 1530 used by the staff member and the history of communication with the camera adapter 1516. For example, a predetermined range determined based on the current time and last communication time from the position of the camera adapter 1516 communicated last can be specified as the position where the staff member exists. In addition, the work of the staff member who moves in a specific direction may be estimated from the communication history, and the position of the staff member may be estimated based on the information of this moving direction.

In the above embodiments, the installation of components has been mainly described. However, this system may be applied to the removal of components. At this time, in an example of the component installation, for example, the cable connection state can be managed by the number of components which "are being connected". At the time of removal of the components, the progress statuses can be determined by managing the connection states by using the number of components which "are not connected".

Similar progress management can be performed by processing other than the workflow described above. For example, as for the transportation of a component, delivery for transporting the component to a mounting position, camera posture adjustment, installation of the network cable, and installation of the power supply cable, similar progress management can be executed by inputting a signal representing the task completion state to the external device connection state detection unit 1735. Note that the signal indicating the task completion state is configured to be generated such that, for example, a task management switch is prepared for the camera adapter 1516, and the operator or worker presses the switch upon completion of the predetermined task. Accordingly, the signal can be input to the external device connection state detection unit 1735 every time the predetermined task is complete, and progress management can be appropriately performed.

In the above embodiments, the correction plan is generated and displayed based on the reference data and the state data. However, if the correction plan is not generated, a warning may be alarmed to the user. For example, if the correction plan is not generated (cannot be generated), an alert may be displayed on the screen of the camera operation terminal 1530.

According to the present disclosure, the user convenience in the installation and operation of the multi-camera system can be improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus, comprising:
one or more memories storing instructions; and
one or more processors executing the instructions to:
obtain information representing status of a plurality of devices relating to a progress state of processes included in a workflow relating to one or more tasks regarding a setting of a multi-camera system that is configured by comprising the plurality of devices, wherein the one or more tasks are to be performed from installation of the multi-camera system to capturing of an object for which three-dimensional shape data is to be generated;
cause a display apparatus to display information relating to the processes included in the workflow and information representing the progress state of the processes; and
detect abnormality, wherein
the progress state includes one of statuses including non-execution and normal end, and
the one or more processors executes the instructions to change, in a case where the abnormality is detected, information representing the progress state of a process that is, among processes whose progress state is the normal end, affected from the abnormality from information representing the normal end to information representing the non-execution.

2. The information processing apparatus according to claim 1, wherein the one or more processors further execute the instructions to accept a user operation relating a process to be performed, and
wherein information representing the status of the plurality of devices relating to the process corresponding to the user operation is obtained.

3. The information processing apparatus according to claim 2, wherein, in a case where a process that is to have been completed at a time when the process corresponding to the user operation is performed has not been completed, the display apparatus displays a warning.

4. The information processing apparatus according to claim 1, wherein information representing a category including one or more of the processes and information representing a progress state of the category is displayed in the screen.

5. The information processing apparatus according to claim 1, wherein the plurality of devices include a plurality of image capturing apparatuses, and
wherein the processes includes at least one of processes including connecting the plurality of image capturing apparatuses to the multi-camera system, synchronization of the plurality of image capturing apparatuses, adjustment of a viewing angle for images to be captured by the plurality of image capturing apparatuses, adjustment of an exposure for images to be captured by the plurality of image capturing apparatuses, and calibration of the plurality of image capturing apparatuses.

6. The information processing apparatus according to claim 1, wherein the progress state is one of the non-execution, execution in progress, the normal end, and abnormal end.

7. The information processing apparatus according to claim 1, wherein a screen in which an area representing the progress state is prepared separately from information on the processes.

8. The information processing apparatus according to claim 1, wherein the progress state is displayed in a distinguishable manner by at least one of the color of an area representing the progress state, size of the area, a pattern of the area, and an animation in the area.

9. The information processing apparatus according to claim 1, wherein notification of occurrence of abnormality regarding each of the plurality of devices is obtained, and
wherein a screen in which the progress state of a process affected by the abnormality is displayed.

10. The information processing apparatus according to claim 1, wherein the one or more processors further execute the instructions to accept a user operation for changing the progress state;
further comprising a unit configured to accept a user operation for changing the progress state.

11. The information processing apparatus according to claim 1, wherein the multi-camera system is a system to generate a virtual viewpoint image.

12. The information processing apparatus according to claim 1, wherein the multi-camera system is a system in which an object is captured from a plurality of directions to generate three-dimensional shape data of the object.

13. The information processing apparatus according to claim 1, wherein
each of the processes is classified into one of a plurality of categories including a first category and a second category, and
information representing the plurality of categories, information representing one or more processes belonging to the first category, and information representing the progress state of the one or more processes belonging to the first category are displayed.

14. A method executed by an information processing apparatus, comprising:
obtaining information representing status of a plurality of devices relating to a progress state of processes included in a workflow relating to one or more tasks regarding a setting of a multi-camera system that is configured by comprising the plurality of devices, wherein the one or more tasks are to be performed from installation of the multi-camera system to capturing of an object for which three-dimensional shape data is to be generated;

causing a display apparatus to display information relating to the processes included in the workflow and information representing the progress state of the processes; and detecting abnormality, wherein the progress state includes one of statuses including non-execution and normal end, and in a case where the abnormality is detected, information representing the progress state of a process that is, among processes whose progress state is the normal end, affected from the abnormality is changed from information representing the normal end to information representing the non-execution.

15. The method according to claim 14, further comprising accepting a user operation relating a process to be performed, and wherein information representing the status of the plurality of devices relating to the process corresponding to the user operation is obtained.

16. The method according to claim 15, wherein, in a case where a process that is to have been completed at a time when the process corresponding to the user operation is performed has not been completed, the display apparatus displays a warning.

17. The method apparatus according to claim 14, wherein information representing a category including one or more of the processes and information representing a progress state of the category is displayed in the screen.

18. A non-transitory computer-readable storage medium that stores a program for causing a computer to:

obtain information representing status of a plurality of devices relating to a progress state of processes included in a workflow relating to one or more tasks regarding a setting of a multi-camera system that is configured by comprising the plurality of devices, wherein the one or more tasks are to be performed from installation of the multi-camera system to capturing of an object for which three-dimensional shape data is to be generated;

cause a display apparatus to display information relating to the processes included in the workflow and information representing the progress state of the processes; and detect abnormality, wherein the progress state includes one of statuses including non-execution and normal end, and in a case where the abnormality is detected, information representing the progress state of a process that is, among processes whose progress state is the normal end, affected from the abnormality is changed from information representing the normal end to information representing the non-execution.

\* \* \* \* \*